(12) United States Patent
Pribble et al.

(10) Patent No.: US 12,293,600 B2
(45) Date of Patent: *May 6, 2025

(54) AUTOMATIC IMAGE CAPTURE SYSTEM BASED ON A DETERMINATION AND VERIFICATION OF A PHYSICAL OBJECT SIZE IN A CAPTURED IMAGE

(71) Applicant: Capital One Services, LLC, McLean, VA (US)

(72) Inventors: Jason Pribble, McLean, VA (US); Daniel Alan Jarvis, Vienna, VA (US); Nicholas Capurso, Tysons Corner, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,405

(22) Filed: Aug. 14, 2023

(65) Prior Publication Data

US 2024/0037974 A1 Feb. 1, 2024

Related U.S. Application Data

(63) Continuation of application No. 17/589,214, filed on Jan. 31, 2022, now Pat. No. 11,727,707, which is a
(Continued)

(51) Int. Cl.
*G06V 30/414* (2022.01)
*G06T 7/62* (2017.01)
*G06V 30/142* (2022.01)

(52) U.S. Cl.
CPC .............. *G06V 30/414* (2022.01); *G06T 7/62* (2017.01); *G06V 30/142* (2022.01); *G06T 2207/30176* (2013.01)

(58) Field of Classification Search
USPC ........................................................ 358/473
See application file for complete search history.

(56) References Cited

U.S. PATENT DOCUMENTS

| 4,264,808 A | 4/1981 | Owens |
| 4,564,752 A | 1/1986 | Lepic |

(Continued)

FOREIGN PATENT DOCUMENTS

| CN | 1967565 A | 5/2007 |
| CN | 1897644 B | 5/2010 |

(Continued)

OTHER PUBLICATIONS

"Deposit Checks by Mobile," Jul. 22, 2005, retrieved from https://www.elmundo.es/navegante/2005/07/21/empresas/1121957427.html (Retrieved: Jan. 12, 2023) (machine translation with original).

(Continued)

*Primary Examiner* — Jacky X Zheng
(74) *Attorney, Agent, or Firm* — Sterne, Kessler, Goldstein & Fox P.L.L.C.

(57) ABSTRACT

Described herein is a system for automatically capturing images. A device may execute an application on the device. In response to receiving a request for capturing an image of a document, the application may control the operation of the camera to contemporaneously and continuously capture image frames of an area within the field of view of a camera of the device. The field of view may include an object and in turn may be included in the captured image frames. The application may determine whether the aspect ratio and real-world size of the object in the captured image frames corresponds with a specified threshold size and aspect ratio which corresponds with a given document type. In response
(Continued)

to determining the object corresponds to the given document type, the camera may automatically extract an image of the object.

20 Claims, 16 Drawing Sheets

Related U.S. Application Data continuation of application No. 16/855,556, filed on Apr. 22, 2020, now Pat. No. 11,238,276, which is a continuation of application No. 16/435,074, filed on Jun. 7, 2019, now Pat. No. 10,635,898.

(56) References Cited

U.S. PATENT DOCUMENTS

| | | | |
|---|---|---|---|
| 5,077,805 | A | 12/1991 | Tan |
| 5,164,833 | A | 11/1992 | Aoki |
| 5,345,090 | A | 9/1994 | Hludzinski |
| 5,455,875 | A | 10/1995 | Chevion |
| 6,148,102 | A | 11/2000 | Stolin |
| 6,149,056 | A | 11/2000 | Stinson |
| 6,370,269 | B1 | 4/2002 | Al-Karmi |
| 6,697,091 | B1 | 2/2004 | Rzepkowski |
| 6,922,487 | B2 | 7/2005 | Dance |
| 6,930,718 | B2 | 8/2005 | Parulski |
| 6,931,255 | B2 | 8/2005 | Mekuria |
| 6,944,773 | B1 | 9/2005 | Abrahams |
| 7,027,171 | B1 | 4/2006 | Watanabe |
| 7,028,886 | B1 | 4/2006 | Maloney |
| 7,120,461 | B2 | 10/2006 | Cho |
| 7,392,935 | B2 | 7/2008 | Byrne |
| 7,419,093 | B1 | 9/2008 | Blackson |
| 7,778,457 | B2 | 8/2010 | Nepomniachtchi |
| 7,792,753 | B1 | 9/2010 | Slater |
| 7,873,200 | B1 | 1/2011 | Oakes, III |
| 7,996,312 | B1 | 8/2011 | Beck |
| 8,064,729 | B2 | 11/2011 | Li |
| 8,131,636 | B1 | 3/2012 | Viera |
| RE44,274 | E | 6/2013 | Popadic |
| 8,699,779 | B1 | 4/2014 | Prasad |
| 8,708,227 | B1 | 4/2014 | Oakes, III |
| 8,743,058 | B2 | 6/2014 | Zhu |
| 8,768,836 | B1 | 7/2014 | Acharya |
| 8,977,571 | B1 | 3/2015 | Bueche, Jr. |
| 8,995,774 | B1 | 3/2015 | van Deventer et al. |
| 9,129,340 | B1 | 9/2015 | Medina, III |
| 9,672,510 | B2 | 6/2017 | Roach et al. |
| 9,916,500 | B2 | 3/2018 | Solano et al. |
| 10,013,605 | B1 | 7/2018 | Oakes, III |
| 10,013,681 | B1 | 7/2018 | Oakes, III |
| 10,217,179 | B2 | 2/2019 | Rodriguez et al. |
| 10,242,283 | B1 | 3/2019 | Jain et al. |
| 10,248,878 | B2 | 4/2019 | Zhu |
| 10,262,220 | B1 | 4/2019 | Pribble et al. |
| 10,339,374 | B1 | 7/2019 | Pribble et al. |
| 10,402,944 | B1 | 9/2019 | Pribble et al. |
| 10,635,898 | B1 | 4/2020 | Pribble et al. |
| 2002/0001393 | A1 | 1/2002 | Jones |
| 2002/0145035 | A1 | 10/2002 | Jones |
| 2002/0172516 | A1 | 11/2002 | Aoyama |
| 2003/0051138 | A1 | 3/2003 | Maeda |
| 2003/0086615 | A1 | 5/2003 | Dance |
| 2003/0097592 | A1 | 5/2003 | Adusumilli |
| 2004/0017482 | A1 | 1/2004 | Weitman |
| 2004/0205459 | A1 | 10/2004 | Green |
| 2004/0257626 | A1 | 12/2004 | Panini |
| 2005/0036665 | A1 | 2/2005 | Higuchi |
| 2005/0078192 | A1 | 4/2005 | Sakurai |
| 2005/0097046 | A1 | 5/2005 | Singfield |
| 2005/0100216 | A1 | 5/2005 | Myers |
| 2005/0216410 | A1 | 9/2005 | Davis |
| 2005/0267843 | A1 | 12/2005 | Acharya |
| 2005/0281448 | A1 | 12/2005 | Lugg |
| 2005/0281450 | A1 | 12/2005 | Richardson |
| 2006/0026140 | A1 | 2/2006 | King |
| 2006/0045379 | A1 | 3/2006 | Heaney |
| 2006/0106717 | A1 | 5/2006 | Randle |
| 2006/0112013 | A1 | 5/2006 | Maloney |
| 2006/0152576 | A1 | 7/2006 | Kiessling |
| 2006/0164682 | A1 | 7/2006 | Lev |
| 2006/0242062 | A1 | 10/2006 | Peterson |
| 2006/0242063 | A1 | 10/2006 | Peterson |
| 2006/0249567 | A1 | 11/2006 | Byrne |
| 2007/0118747 | A1 | 5/2007 | Pintsov |
| 2007/0183652 | A1 | 8/2007 | Backstrom |
| 2007/0262148 | A1 | 11/2007 | Yoon |
| 2009/0114716 | A1 | 5/2009 | Ramachandran |
| 2009/0185241 | A1 | 7/2009 | Nepomniachtchi |
| 2009/0185737 | A1 | 7/2009 | Nepomniachtchi |
| 2010/0078472 | A1 | 4/2010 | Lin |
| 2010/0128131 | A1 | 5/2010 | Tenchio |
| 2011/0175815 | A1 | 7/2011 | Zhu |
| 2011/0285874 | A1 | 11/2011 | Showering et al. |
| 2012/0162083 | A1 | 6/2012 | Zhu |
| 2012/0163664 | A1 | 6/2012 | Zhu |
| 2013/0155474 | A1 | 6/2013 | Roach |
| 2014/0032406 | A1* | 1/2014 | Roach ............... G06Q 20/042 |
| | | | 705/42 |
| 2017/0132866 | A1 | 5/2017 | Kuklinski et al. |
| 2020/0387702 | A1 | 12/2020 | Pribble et al. |

FOREIGN PATENT DOCUMENTS

| | | |
|---|---|---|
| DE | 10201987 A1 | 7/2003 |
| DE | 10209973 A1 | 10/2003 |
| EP | 0905643 A2 | 3/1999 |
| EP | 0984410 A1 | 3/2000 |
| EP | 2306270 A1 | 4/2011 |
| EP | 2472372 A1 | 7/2012 |
| EP | 2477103 A1 | 7/2012 |
| EP | 2306270 B1 | 6/2020 |
| JP | 200423158 A | 1/2004 |
| JP | 2004054758 A | 2/2004 |
| JP | 2006174105 A | 6/2006 |
| KR | 1020060010507 A | 2/2006 |
| KR | 1020070065958 A | 6/2007 |
| WO | 2001061436 A2 | 8/2001 |
| WO | 2005043857 A1 | 12/2005 |
| WO | 2005124657 A1 | 12/2005 |
| WO | 2006086768 A2 | 8/2006 |

OTHER PUBLICATIONS

"Amena and Bankinter Allow Check Cashing by Mobile phone," Jul. 21, 2005, retrieved from https://www.itespresso.es/amena-y-bankinter-habilitan-el-ingreso-de-cheques-desde-el-movil-21004.html (Retrieved: Jan. 12, 2023) (machine translation with original).

"Amena and Bankinter Enable the Deposit of Checks from the Mobile," Jul. 21, 2005, retrieved from https://www.itespresso.es/amena-y-bankinter-habilitan-el-ingreso-de-cheques-desde-el-movil-21004.html (Retrieved: Jan. 12, 2023) (machine translation with original).

"Mobile Banking Deposit Remote Deposit Deposit by Phone Wells Fargo," retrieved from https://www.wellsfargo.com/es/mobile/apps/mobile-deposit/ (Retrieved: Jan. 12, 2023) (machine translation with original).

"Bank of America Adds Mobile Check Deposit to iPhone App," Aug. 9, 2012, retrieved from https://www.huffpost.com/entry/bank-of-america-mobile-check-deposit_n_1760872 (Retrieved: Jan. 12, 2023).

"Banco Sabadell Allows You to Deposit Checks with Your Mobile," Jan. 18, 2011, retrieved from https://www.computerworld.es/archive/banco-sabadell-permite-ingresar-cheques-con-el-movil (Retrieved: Jan. 12, 2023).

"La Caixa Launches an Application to Deposit Checks and Promissory Notes," Dec. 22, 2011, retrieved from https://www.caixabank.com/comunicacion/noticia/la-caixa-lanza-una-aplicacion-para-ingresar-cheques-y-pagares-con-el-iphone--1775-c-15379--_es.h...(Retrieved: Jan. 12, 2023).

(56) References Cited

OTHER PUBLICATIONS

"Remote Deposit Capture Goes Mobile: Mitek Systems Launches First Mobile Check Deposit and Bill Pay Application," Jan. 22, 2008 retrieved from https://www.remotedepositcapture.com/news/Remote-Deposit-Capture-Goes-Mobile-Mitek-Systems.aspx (Retrieved: Oct. 28, 2022).
"Mitek Launches Mobile Phone Check Capture Solution," Jan. 24, 2008, retrieved from https://www.banktech.com/payments/mitek-launches-mobile-phone-check-capture-solution/d/d-id/1291677.html (Retrieved: Oct. 28, 2022).
"Retail Decisions Selects Mitek System's Distributed Recognition Software for Merchant Check Processing," Mitek Systems, Inc., Dec. 8, 2005 (Year: 2005).
Hill, "A Complete History of the Camera Phone," Digital Trends, Aug. 11, 2013, retrieved from https://www.digitaltrends.com/mobile/camera-phone-history/ (Retrieved: Oct. 28, 2022).
Wolpin, "Nokia N90 Review," Digital Trends, Apr. 20, 2006, retrieved from https://www.digitaltrends.com/mobile/nokia-n90-review/ (Retrieved: Oct. 28, 2022).
Shankland, "Here's How Adobe's Camera App for Serious Photographers Is Different," CNET, Sep. 6, 2022, retrieved from https://www.cnet.com/google-amp/-/news/here-comes-adobes-camera-app-for-serious-photographers/ (Retrieved: Oct. 28, 2022).
Samsung Electronics Canada, Inc. "SCH-i910 Portable Dualmode Smartphone User Guide," UG_EN_i910_03162009_D14, 2009, retrieved from www.Manualslib.com (Year: 2009).
Motorola, Inc., "Motorokr E6 GSM," Motomanual, 2006 (Year: 2006).
Valdman, "Log File Analysis," PhD Report, University of West Bohemia in Pilsen, Department of Computer Science and Engineering, Czech Republic, Jul. 2001, Technical Report No. DCSE/TR-2001-04 (Year: 2001).
Adobe Systems Incorporated, "Big Red Book," version 1 2000 (Year: 2000).
Rose, "Canon PowerShot G1 X Mark III Review," Digital Photography Review, Dec. 19, 2017, retrieved from https://www.dpreview.com/reviews/canon-powershot-g1-x-mark-iii-review (Retrieved: Oct. 28, 2022).
Askey, "Minolta DiMAGE A1 Review," Digital Photography Review, Nov. 11, 2003, retrieved from https://www.dpreview.com/reviews/minoltadimagea1 (Retrieved: Oct. 28, 2022).
Askey, "Olympus E-10 Review," Digital Photography Review, Jan. 16, 2001, retrieved from https://www.dpreview.com/reviews/olympuse10 (Retrieve: Oct. 28, 2022).
Joinson, "Sony Cyber-shot H1 Review," Digital Photography Review, Jul. 5, 2005, retrieved from https://www.dpreview.com/reviews/sonydsch1 (Retrieved: Oct. 28, 2022).
Heus, "Imaging Products and Services: Case Studies of Banks Leading the Next Wave of the Digital Charge," BankNews, May 2002, pp. 1-2 (Year: 2002).
Koon, The Need for Skills-based Training in a Branch Capture Environment, Today, Dec. 2002, pp. 32-33 (Year: 2002).
NCR Corporation, "NCR 7731 Personal Image Processor," Systems Financial Systems, Apr. 1991, pp. 6-307-6-315 (Year: 1991).
"Istnick, "Deposit Automation," Diebold, Revision 1, Sep. 2003 (Year: 2003)".
"Diebold Incorporated, "ImageWay ATM Check Imaging Software," File. No. 79-824, 2004 (Year: 2004)".
"Breitkopt, "Infonox Says It's Moving Up in Check Imagin," American Banker, Nov. 19, 2002 (Year: 2002)".
uCon, "Logging," retrieved from www.umonfw.com/ucon/htmlhelp/Topic10.htm (Retrieved: Dec. 7, 2022).
uCon, "Script Cmd: LOG," retrieved from www.umonfw.com/ucon/htmlhelp/Topic30.htm (Retrieved: Dec. 7, 2022).
uCon, "Main Window," retrieved from www.umonfw.com/ucon/htmlhelp/Topic41.htm (Retrieved: Dec. 7, 2022).
Taylor, "Work the Shell—Anaylzing Log Files Redux," Linux Journal, Sep. 30, 2006, retrieved from https://www.linuxjournal.com/article/9257 (Retrieved: Dec. 7, 2022).
"Session Replay," Wikipedia, retrieved from https://en.wikipedia.org/wiki/Session_replay, Feb. 27, 2022 (Retrieved: Dec. 7, 2022).
"Tealeaf," Wikipedia, retrieved from https://en.wikipedia.org/wiki/Tealeaf, Oct. 27, 2021 (Retrieved: Dec. 7, 2022).
"Logging (Software)," Wikipedia, retrieved from https://en.wikipedia.org/wiki/Logging_(software), Dec. 4, 2022 (Retrieved: Dec. 7, 2022).
Peters, "The History and Development of Transaction Log Analysis," Library Hi Tech, vol. 11, No. 2, 1993 pp. 41-66 (Year: 1993).
Adobe Systems Incorporated, "TIFF," Revision 6.0 Final, Jun. 3, 1992 (Year: 1992).
"iPhoto," Wikipedia, retrieved from https://en.wikipedia.org/wiki/IPhoto, Oct. 5, 2022 (Retrieved: Dec. 8, 2022).
"Raw Image Format," Wikipediaa, retrieved from https://en.wikipedia.org/wiki/Raw_image_format, Nov. 22, 2022 (Retrieved: Dec. 8, 2022).
"iPhoto Converts Every RAW File into JPEG: Mac Talk Forum," Digital Photography Review, Jul. 3, 2006, retrieved from https://www.dpreview.com/forums/post/19099679 (Retrieved: Dec. 8, 2022).
"History in Check Verification," SQN Banking Systems, retrieved from https://sqnbankingsystems.com/about/ (Retrieved: Dec. 8, 2022).
"Dupe Detective," CONIX Systems, Inc., Jun. 19, 2006, retrieved from https://web.archive.org/web/20060619000907/http://www.conix.com/products/dd.asp (Retrieved: Dec. 8, 2022).
"Detective Suite," CV Systems, LLC, 2022, retrieved from https://cvsystems.com/detective-suite/ (Retrieved: Dec. 8, 2022).
"CIPS," CONIX Systems, Inc., Jun. 19, 2006, retrieved from https://web.archive.org/web/20060619001122/http://www.conix.com/products/cips.asp (Retrieved: Dec. 8, 2022).
"CKLL," CONIX Systems, Inc., Jun. 19, 2006, retrieved from https://web.archive.org/web/20060619001135/http://www.conix.com/products/ckll.asp (Retrieved: Dec. 8, 2022).
"CLAS," CONIX Systems, Inc., Jun. 16, 2006, retrieved from https://web.archive.org/web/20060616201759/http://www.conix.com/products/clas.asp (Retrieved: Dec. 8, 2022).
"CLRS," CONIX Systems, Inc., Jun. 19, 2006, retrieved from https://web.archive.org/web/20060619001152/http://www.conix.com/products/clrs.asp (Retrieved: Dec. 8, 2022).
"QKLL," CONIX Systems, Inc., Jun. 19, 2006, retrieved from https://web.archive.org/web/20060619000930/http://www.conix.com/products/qkll.asp (Retrieved: Dec. 8, 2022).
"Creating x937 Files," CONIX Systems, Inc., Jun. 21, 2006, retrieved from https://web.archive.org/web/20060621161944/http://www.conix.com/Solutions/createx937.asp (Retrieved: Dec. 8, 2022).
"Dupe Detective," CONIX Systems, Inc., Jun. 21, 2006, retrieved from https://web.archive.org/web/20060621162123/http://www.conix.com/products/dd.asp?bc=125 (Retrieved: Dec. 8, 2022).
"Kill During Capture," CONIX Systems, Inc., Jun. 21, 2006, retrieved from https://web.archive.org/web/20060621162046/http://www.conix.com/Solutions/ki‖DurCap.asp (Retrieved: Dec. 8, 2022).
Mag Tek Inc., "Excella STX," 2022 (Year: 2022).
Andrew Adams, et al., "Viewfinder Alignment," Computer Graphics Forum (Eurographics 2008), vol. 27, No. 2, pp. 597-606 (Apr. 2008).
Specifications for Electronic Exchange of Check and Image Data, DSTU X9.37 (2003).
Alginahi et al, "Optical Character Recognition System Based on a Novel Fuzzy Descriptive Features," IEEE, ICSP'04 Proceedings, 2004, pp. 926-929 (Year: 2004).
Parikh, "Using Mobile Phones for Secure, Distributed Document Processing in the Developing World," IEEE Pervasive Computing Mobile and Ubiquitious Systems, vol. 4, No. 2, Apr.-Jun. 2005, pp. 74-81 (Year: 2005).
Motorola, Inc., "Motomanual A1200 GSM," Sep. 2005, pp. 1-140 (Year: 2005).
Rohs and Zweifel, "A Conceptual Framework for Camera Phone-based Interaction Techniques," Institute for Pervasive Computing.
Rohs and Gfeller, "Using Camera-equipped Mobile Phones for Interacting with Real-world Objects," Institute for Pervasive Computing.
NTT DoCoMo, "Manual for FOMA N902i," May 2011 (Year: 2011).

(56) References Cited

OTHER PUBLICATIONS

"Parikh et al, "Mobile Phones and Paper Documents: Evaluating A New Approach for Capturing Microfinance Data in Rural India," 2006 CHI, Montreal, Quebec, Canada, Apr. 22-27, 2006, DOI: 10.1145/1124772.1124857 (Year; 2006)".

"Bae et al, "Character Recognition System for Cellular Phone with Camera,"IEEE, Proceedings of the 29th Annual International Computer Software and Applications Conference (COMPSAC'05), 2005 (Year: 2005)".

Newman et al, "CamWorks: A Video-based Tool for Efficient Capture from Paper Source Documents," IEEE, 1999, pp. 647-653 (Year: 1999).

"Yamashita et al, "Shape Reconstruction and Image Restoration for Non-Flat Surfaces of Documents with a Stereo Vision System," Sep. 2004, DOI: 10.1109/ICPR.2004.1334171 (Year: 2004)".

Szeliski, "Image Alignment and Stitching: A Tutorial," Microsoft Research Technical Report MSR-TR-2004-92, Dec. 10, 2006, pp. 1-87 (Year: 2006).

"Trimeche et al, "Enhanced Mobile Imaging for Document Applications," Nokia Research Center Multimedia Technologies Laboratory".

"Dimauro et al, "A New Database for Research on Bank-check Processing," IEEE Computer Society, Proceedings of the Eighth International Workshop on Frontiers in Handwriting Recognition (IWFHR'02), 2002 (Year: 2002)".

Wellner, "Interacting with Paper on the Digital Desk," Communications of the ACM, vol. 36, No. 7, Jul. 1993, pp. 87-96 (Year: 1993).

"Fiserv Introduces iLink Remote Deposit System for Corporate Cheques," Apr. 13, 2005, retrieved from https://www.finextra.com/pressarticle/3974/fiserv-introduces-ilink-remote-deposit-system-for-corporate-cheques (Retrieved: Oct. 18, 2022).

Liang et al, "Camera-based Analysis of Text and Documents: a Survey," IJDAR, vol. 7, 2005, pp. 84-104 (Year: 2005).

"Mobile Check Deposit," Feb. 25, 2009, retrieved from https://cardflash.com/news/2009/02/mobile-check-deposit/ (Retrieved: Nov. 2, 2022).

"Mitek Develops Cheque Imaging Tool for BlackBerry," Sep. 11, 2008, retrieved from https://www.finextra.com/pressarticle/23294/mitek-develops-cheque-imaging-tool-for-blackberry (Retrieved: Nov. 2, 2022).

"Cheque Imaging Goes Mobile with Mitek," May 1, 2008, retrieved from https://www.electronicpaymentsinternational.com/news/cheque-imaging-goes-mobile-with-mitek/ (Retrieved: Nov. 2, 2022).

"Deposit Checks Using Cell Phone Camera," Jul. 31, 2009, retrieved from www.phones.com/news/deposit-checks-using-cell-phone-camera/ (Retrieved: Nov. 2, 2022).

"Bankinter Launches a Service to Deposit Checks by Mobile," Jul. 22, 2005, retrieved from https://cincodias.elpais.com/cincodias/2005/07/22/empresas/1122039623_850215.html (Retrieved: Nov. 2, 2022).

"Amena and Bankinter Launch Mobilcheck, retrieved from https://app.vlex.com/#vid/322875 (Retrieved: Nov. 1, 2022)".

"Bankinter Allows You to Deposit Checks with Your Mobile," Jul. 22, 2005, retrieved from https://www.baquia.com/emprendedores/bankinter-permite-ingresar-cheques-con-el-movil (Retrieved: Nov. 2, 2022).

"Amena and Bankinter Launch a Financial Service that Allows You to Deposit Checks from Your Mobile," May 24, 2014, retrieved from https://www.noticiasdot.com/publicaciones/2005/0705/2207/noticias/noticias_220705-09.htm (Retrieved: Nov. 2, 2022).

"Mitek Releases Receipt Imaging App for iPhone," Jul. 21, 2009, retrieved from www.banktech.com/channels/mitek-releases-receipt-imaging-app-for-iphone/d/d-id/1293059.html (Retrieved: Nov. 2, 2022).

"Business Expense Management Application for iPhone," Jul. 31, 2009, retrieved from https://www.sociableblog.com/2009/07/31/business-expense-mangement-application-for-iphone/ (Retrieved: Nov. 2, 2022).

"Mitek Systems Launches Business Expense Management Application On The App Store," Jul. 21, 2009, retrieved from https://www.fieldtechnologiesonline.com/doc/mitek-systems-launches-business-expense-0001 (Retrieved: Nov. 2, 2022).

"San Antonio Credit Union is Unveiling Smart-phone Deposit Service, Oct. 18, 2009, retrieved from https://www.bizjournals.com/sanantonio/stories/2009/10/19/story2.html (Retrieved: Nov. 2, 2022)".

"FinovateFall 2009 / mShift," Nov. 2009, retrieved from https://finovate.com/videos/finovateflagship-2009-mshift/ (Retrieved: Nov. 2, 2022).

Lange, "Combining Remote Capture and IRD Printing," All My Papers, Aug. 2005, pp. 1-25 (Year: 2005).

Carreker and Massie, "One Size Fits Nobody," 2005, pp. 1-13 (Year: 2005).

"Two Words Every Business Should Know: Remote Deposit," Canon U.S.A., Inc., 2005, pp. 1-7 (Year: 2005).

Hoflich, "Telcos: Friends or Foes in Mobile Phone Banking?," The Asian Banker, Jun. 15, 2006, retrieved from https://snapshot.factiva.com/Article/Print (Retrieved: Nov. 20, 2022).

Todd, "Making a Deposit in the Future," SCB, 2006, pp. 82-85 (Year: 2006).

Weatherington, "Convergence, Payments & Security: Bank Technology Trends," Connecticut Banking Magazine, Fourth Quarter 2007, pp. 16-18 (Year: 2007).

Carruba. "Consumer Capture," Remote Deposit Capture: Practical Considerations, Issue No. 2, Sheshunoff, pp. 5-12 (Year: 2008).

Fisher, Chapter 8 "Image Exchange," Chapter 10 "Prospects and Possibilities," Chapter 21 "Check 21, An Epic Beginning," Capturing Your Customer! The New Technology of Remote Deposit, 2006, pp. 75-83, 91-97, 103-108 (Year: 2006).

"Kapfer and Aggarwal, "Next Generation Internet Banking: Maximising Revenue Streams," Asian Banker Research, Mar. 2008, pp. 1-86 (Year: 2008)".

Iguchi, "Strategies for Innovation in the Japanese Banking Industry," Masters Thesis submitted to MIT Sloan School of Management, May 7, 2004, pp. 1-132 (Year: 2004).

Kniberg, "What Makes a Micropayment Solution Succeed," Masters Thesis submitted to KTH Department of Applied IT, Jan. 2002, pp. 1-68 (Year: 2002).

Flinders, "Entering an Age of Mobile Banking," Computer Weekly, Oct. 21, 2008 (Year: 2008).

"Rakuten, Inc. History, Profile and Corporate Video," 2022, retrieved from https://www.companieshistory.com/rakuten/ (Retrieved: Dec. 12, 2022).

"Asian Operators Beign to Realise Mobile Dream," ProQuest, 2022 (Year: 2022).

"Poll Shows Number Portability Tops Mobile Market News," The Korea Times, Dec. 29, 2003 (Year: 2003).

"Bruno-Britz, Maria, "Branch In a Box—As Banking Technology and Strategy Evolve, ATMs Can Provide Consumers with All the Conveniences of Branch Banking," Bank Systems + Technology, Jul. 1, 20025 (Year: 2005)".

"eBank Systems Introduces Internet Banking; Beacon Software, Inc., Licenses the Compass Internet Banking Platform and Scores Their First Community Bank Customer of eBank Systems," Business Wire, May 11, 2005, (Year: 2005).

"Kyushu Electric to Accept Power-bill Payments Via Mobile Phone," Kyodo Noews, May 30, 2007 (Year: 2007).

"Banks Go Hi-tech and Bring Back the Good Old Days," The Independent, Jul. 17, 2005 (Year: 2005).

"Kill List Creation," CONIX Systems, Inc., Jun. 21, 2006, retrieved from https://web.archive.org/web/20060621161912/http://www.conix.com/Solutions/ki∥ListCreat.asp (Retrieved: Dec. 8, 2022).

"Reduce Holdover," CONIX Systems, Inc., Jun. 17, 2006, retrieved from https://web.archive.org/web/20060617204833/http://www.conix.com/Solutions/redHold.asp (Retrieved: Dec. 8, 2022).

"CONIX Systems Launches Dupe Detective," CONIX Systems Inc., May 18, 2006 (Year: 2006).

"Bankinter 1965-2015, A Look Back at our History," Bankinter, 2015, available at https://docs.bankinter.com/www/webcorp/swf/memoria2015/50aniversario/index.html.

"BBVA, Bankinter Offer Rival Mobile Banking Solutions," Telecompaper, Jul. 26, 2005, retrieved from https://www.telecompaper.com/news/bbva-bankinter-offer-rival-mobile-banking-solutions-482150 (Retrieved: Dec. 8, 2022).

(56) References Cited

OTHER PUBLICATIONS

Editorial of Baquia, "Bankinter Allows You to Enter Checks with Your Mobile," Baquia, retrieved from https://www.baquia.com/emprendedores/bankinter-permite-ingresar-cheques-con-el-movil (Retrieved: Dec. 8, 2022).
"Editorial of Baquia," Baquia, retrieved from https://www.baquia.com/author/redaccion2014 (Retrieved: Dec. 8, 2022).
"Symantec Protects Smartphones," retrieved from https://www.noticiasdot.com/publicationes/2005/0705/2207/noticias/noticias_220705-09.htm (Retrieved: Dec. 8, 2022).
"El Movil Acude en Ayuda de los Inversores," retrieved from https://app.vlex.com/#search/jurisdiction:US,ES+country_jurisdiction:AFD,AS/amena+and+movilcheck/WW/vid/1798503 (Retrieved: Dec. 8, 2022).
"Movilcheck," elportaldeservicios.com, Jul. 29, 2005, retrieved from www.elportaldeservisios.com/elportaldeservicios_noticias_detalle.php?nid=519 (Retrieved: Dec. 8, 2022).
"Evaluating the Vendors or Remote Deposit: Differentiate, or Step Aside," Aite Group, LLC, Apr. 2008 (Year: 2008).
MagTek Inc., "MICRImage," 2022 (Year: 2022).
Digital Transactions, vol. 3, No. 1, Jan.-Feb. 2006 (Year: 2006).
MagTek Inc., "MICRImage Check Reader Technical Reference Manual," Manual Part No.: 99875173 Rev 8, Oct. 2008 (Year: 2008).
"Excella," MagTek Inc., 2004, retrieved from Internet Archives Wayback Machine, http://www.magtekcom/products/check_reading/excella/excella.asp.
"Support," MagTek Inc., 2005, retrieved from Internet Archives Wayback Machine, http://www.magtekcom/support/documentation/check_reading.asp.
"EC6000i Gen2 Series," RDM Corporation, 2004, retrieved from Internet Archives Wayback Machine, http://www.rdmcorp.com/EC6000iSeries.shtml.
"RDM Selects Mitek Systems for Point-of-Oresentment Check 21 Imaging," Mitek Systems, Inc., May 4, 2005 (Year: 2005).
"RDM Corporation Introduces New Imaging Solution for Check 21," RDM Corporation, Apr. 12, 2005 (Year: 2005).
Preville, "Commerciant: Payment Processor," ACHR News, Sep. 14, 2002 (Year: 2002).
"The Green Sheet," Issue 06:03:01, Mar. 13, 2006 (Year: 2006).
"BankServ, "Mobilescape 5000 User Guide," Manual No.: 100433 Rev. L, 2009 (Year: 2009)".
"(BW) DuPure Commerciant Announces B Certification for Mobilecape(R) 5000 from Global eTelecom, Inc. (GETI); Market's First Wireless, Handheld Check and Credit Card Processing Device Provices a Unique Offering for GETI's Nationwide Agent Network," Business Wire, Sep. 18, 2006, retrieved from https://www.chron.com/news/article/BW-Commerciant-Announces-B-Certification-for-1884697.php (Retrieved: Dec. 14, 2022).
"(BW) DuPure International Chooses Mobilescape(R) by Commerciant for Wireless Credit Card and Check Payments," Business Wire, Sep. 25, 2006, retrieved from https://www.chron.com/news/article/BW-DuPure_International-Chooses-Mobilescape-R-1885741.php (Retrieved: Dec. 14, 2022).
"Unisys Selects Panini Image Capture Technology for its Cheque Processing Product," May 18, 2004 (Year: 2004).
"Silver Bullet's Ranger Available for Panini's New MVX SD Check Scanner," Silver Bullet, Oct. 25, 2006, retrieved from https://sbullet.com/press-releases/silver-bullets-ranger-available-for-paninis-new-mvx-sd-check-scanner/ (Retrieved: Mar. 1, 2024).
"About," Silver Bullet Technology, Inc., 2021 (YEAR: 2021).
"Ranger Supported Check Scanners," Silver Bullet Technology, Inc., 2021 (YEAR: 2021).
"Epson Launches Suite of Check Scanners for Small Business Market," RDC Remote Deposit Capture, Apr. 6, 2009, retrieved from https://www.remoteddepositcapture.com/news/EPSON-PAUNCHES-SUITE-OF-CHECK-SCANNERS-FOR-SMALL-B.aspx (Retrieved: Dec. 14, 2022).

\* cited by examiner

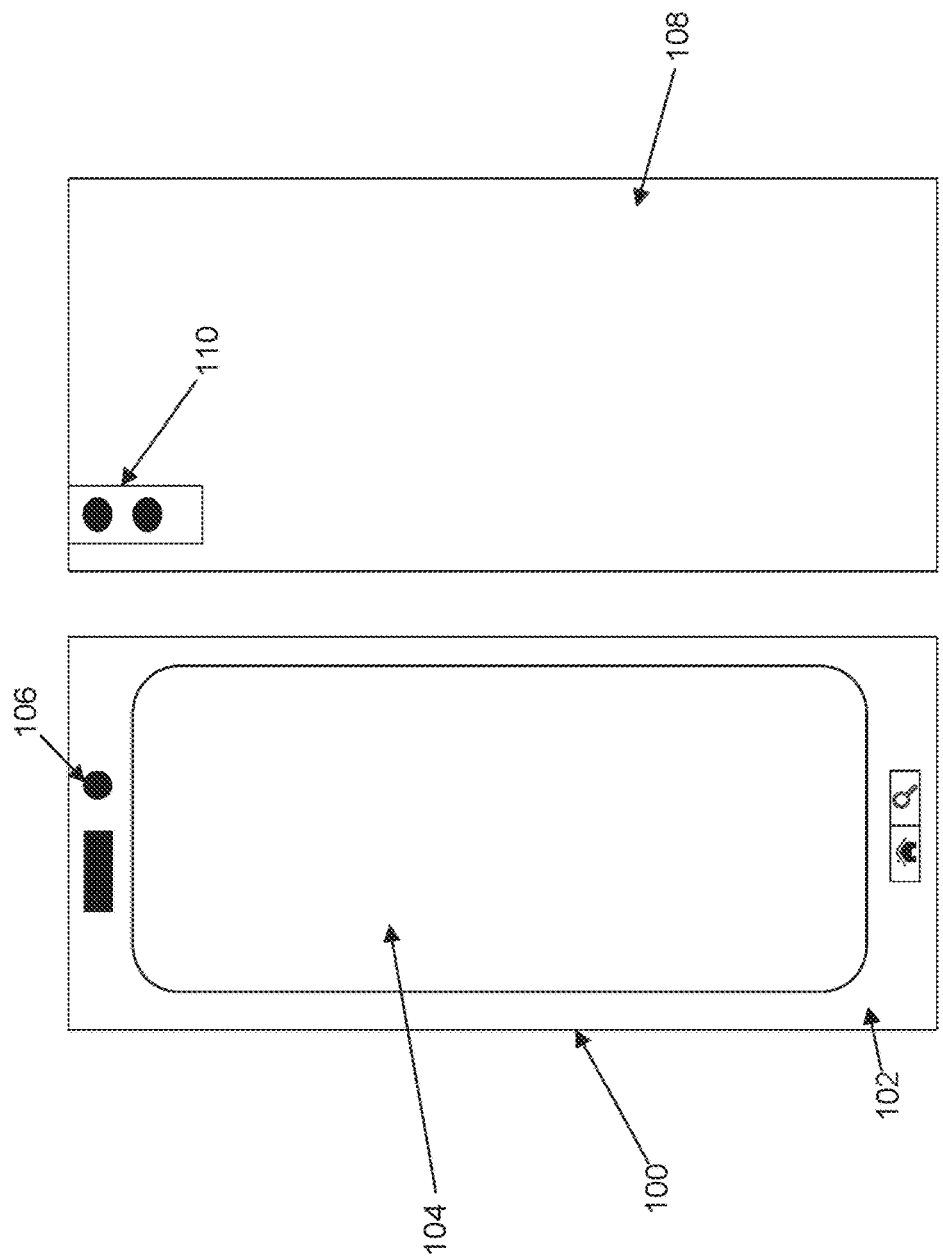

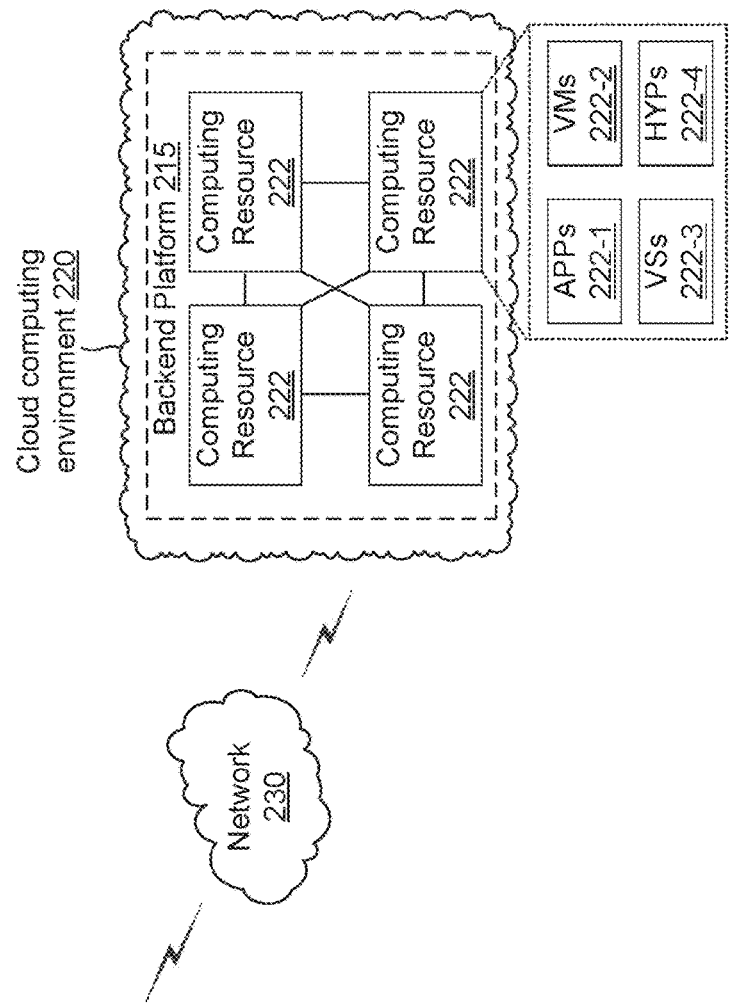
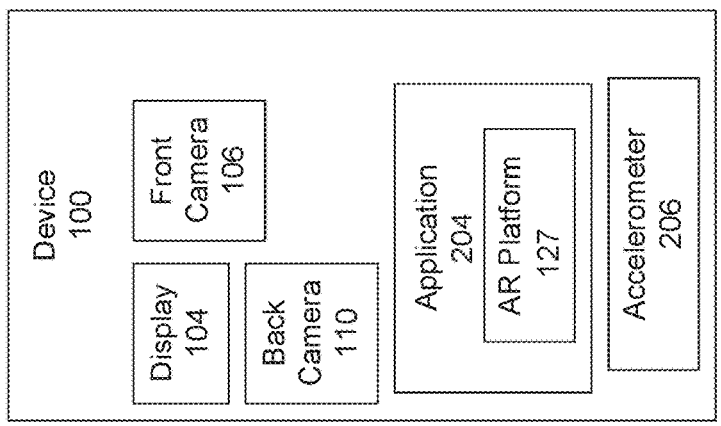
FIG. 2

AUTOMATIC IMAGE CAPTURE SYSTEM BASED ON A DETERMINATION AND VERIFICATION OF A PHYSICAL OBJECT SIZE IN A CAPTURED IMAGE

CROSS-REFERENCE TO RELATED APPLICATIONS

This application is a Continuation Application of U.S. application Ser. No. 17/589,214, filed Jan. 31, 2022, which is a Continuation Application of U.S. application Ser. No. 16/855,556, filed on Apr. 22, 2020 (now U.S. Pat. No. 11,238,276), which is a Continuation Application of U.S. application Ser. No. 16/435,074, filed on Jun. 7, 2019 (now U.S. Pat. No. 10,635,898). The contents of each application are incorporated herein by reference in their entirety.

BACKGROUND

Some electronic applications may require user authentication or document verification. For example, a user may be asked to provide a government identification card before being given access to an electronic account. In another example, a user may wish to submit a document for electronic transfer or use, such as a monetary check to be deposited into a bank account. Different entities may allow users to capture images of such documents using a mobile device and submit the images for verification/authentication. However, this may be a cumbersome and error prone process. Conventionally, the mobile device may fail to determine whether a valid document is present in the captured images, or an incorrect image of the document may be transmitted to an external server for processing. The external server may determine whether the document in the captured image is invalid or incorrect and subsequently request a different image of the correct document from the mobile device. In this regard, the back and forth transmission of requests and images of documents between the external server and mobile device may make the process inefficient and slow.

SUMMARY

Described herein is a method, device, and computer readable medium for automatically capturing images based on a verification of image parameters. In an embodiment, a method for automatically capturing images may include capturing, via a camera of a device, image frames having a first object within a field of view of the camera, in response to receiving instructions from an application executed on the device. Each image frame may be associated with at least one environmental feature. The method may further include processing in real-time, via the application executed on the device, each image frame of the image frames to identify an outline of the first object in each image frame, and receiving, via the application executed on the device, a calculated size of the first object for each of the image frames. The calculated size may be based on the outline of the first object and the environmental feature. The method further includes determining, via the application executed on the device, whether the calculated size of the first object in one or more image frames of the image frames is within a threshold size and automatically extracting, via the application executed on the device, an image of the first object from the one or more image frames, in response to determining that the size of the first object is within the threshold size.

In an embodiment, the method may include receiving, via the application executed on the device, a request for an image of a document, and controlling, via the application executed on the device, the operation of the camera of the device to contemporaneously and continuously capture the image frames of an area within the field of view of the camera including the first object, in response to receiving the request for an image of the document. The method may further include determining, via the application executed on the device, an aspect ratio of the first object in each of the image frames, and determining, via the application executed on the device, that the first object corresponds to a given document type based on determining that the size of the first object is within the threshold size and the aspect ratio of the first object corresponds to a specified aspect ratio. The area within the field of view of the camera may include a second object having an aspect ratio corresponding to the specified aspect ratio, and the method may further include determining, via the application executed on the device, that the second object fails to correspond to the given document type based on a calculated size of the second object failing to fall within the threshold size. The captured image of the first object may exclude the second object.

In an embodiment, the method may further include comparing, via the application, the calculated size of the first object received for a given image frame of the image frames to the calculated size of the first object received for other image frames of the image frames, determining, via the application executed on the device, a consistency in the calculated sizes of the first object across the one or more image frames of the image frames based on the comparing, and identifying, via the application executed on the device, a final calculated size of the first object based on calculated sizes of the first object across the one or more image frames when the determined consistency meets a given threshold. The method may further include monitoring, via the application executed on the device, movement of an accelerometer of the device while the camera of the device captures the image frames. The determining a consistency further includes determining the consistency based on the movement of the accelerometer.

In an embodiment, the method may further include determining, via the application an accuracy of the calculated sizes of the first object determined for each of the image frames based on tilt motion and orientation data of the device for each captured image frame of the image frames.

In an embodiment, a device for automatically capturing images may include a memory, an application stored in the memory, a camera, a display, and one or more processors in communication with the camera and the memory. The one or more processors may be configured to execute the application. The application when executed may be configured to capture, using the camera of a device, image frames having an object within a field of view of the camera, in response to receiving instructions from an application executed on the device. Each image frame may be associated with at least one environmental feature. The application may further be configured to process in real-time, each image frame of the image frames to identify an outline of the object in each image frame and receive a calculated size and a calculated aspect ratio of the object for each of the image frames. The calculated size may be based on the outline of the object and the environmental feature. The application when executed may further be configured to determine that the object corresponds to a predetermined document type based on the calculated size of the object in one or more image frames of the image frames being within a threshold size and the aspect ratio of the object corresponding to a predetermined aspect ratio, and extract an image of the object from the one or more image frames, in response to determining that the object corresponds to the predetermined document type.

In an embodiment, the device may further include a buffer configured to store data associated with the one or more image frames. In an embodiment, the processing may include converting the image frame into a grayscale image, generating a blurred image based on the grayscale image, detecting a edges in the blurred image, identifying shapes based on the edges, defining bounding rectangles for the shapes, and determining an outline of the object based on the bounding rectangles. In an embodiment, the display of the device renders an image of the object. In an embodiment, the device may further include an accelerometer configured to detect a tilt motion and generate orientation data of the device while the camera element captures the image frames.

In an embodiment, a non-transitory computer readable medium stores instructions that, when executed by one or more processors of a device may cause the one or more processors to, capture, via a camera of a device, image frames having an object within a field of view of the camera, in response to receiving instructions from an application executed on the device. Each image frame may be associated with at least one environmental feature. The instructions, when executed by the one or more processors, may further cause the one or more processors to process in real-time, via the application executed on the device, each image frame of the image frames to identify the object in each image frame. The processing may include converting the image frame into a grayscale image, generating a blurred image based on the grayscale image, detecting edges in the blurred image, identifying a shape based on the edges, defining bounding rectangles for the shapes, and determining an outline of the object based on the bounding rectangles. The instructions, when executed by the one or more processors, may further cause the one or more processors to receive, via the application executed on the device, a calculated size of the object for each of the image frames. The calculated size may be based on the outline of the object and the environmental feature. The instructions, when executed by the one or more processors, may further cause the one or more processors to determine, via the application executed on the device, whether the calculated size of the object in one or more image frames of the image frames is within a threshold size, and automatically extract, via the application executed on the device, an image of the from the one or more image frames, in response to determining that the size of the object is within the threshold size.

In an embodiment, the instructions, when executed by the one or more processors, may further cause the one or more processors to receive, via the application executed on the device, a request for one or more images of a document, determine, via the application executed on the device, an aspect ratio of the object in each of the image frames, and determine, via the application executed on the device, the object corresponds to a given document type based on determining that the size of the object is within the threshold size and the aspect ratio of the object corresponds to a specified aspect ratio. In an embodiment, the requested one or more images of the document may include a front image of the document and a back image of the document. The document is at least one of a government issued identification card, a health insurance card, an employee identification card, or an identification card issued by a non-government institution.

In an embodiment, the instructions, when executed by the one or more processors, may further cause the one or more processors to render, via a display of the device, each of the image frames having the object, and render, via the display of the device, a boundary box overlaid around edges of the object as each of the frames having the object is rendered on the display, in response to determining the outline of the object. The extracting the image of the object may include cropping the object from within the boundary box overlaid around the edges of the object.

BRIEF DESCRIPTION OF THE DRAWINGS

Illustrative embodiments are shown by way of example in the accompanying drawings and should not be considered as a limitation of the present disclosure. The accompanying figures, which are incorporated in and constitute a part of this specification, illustrate one or more embodiments of the disclosure and, together with the description, help to explain embodiments of the present disclosure. In the figures:

FIG. 1A illustrates an example device according to an embodiment;

FIG. 2 is a block diagram of an environment for automatically capturing images according to an embodiment;

DETAILED DESCRIPTION

Figure 1B:
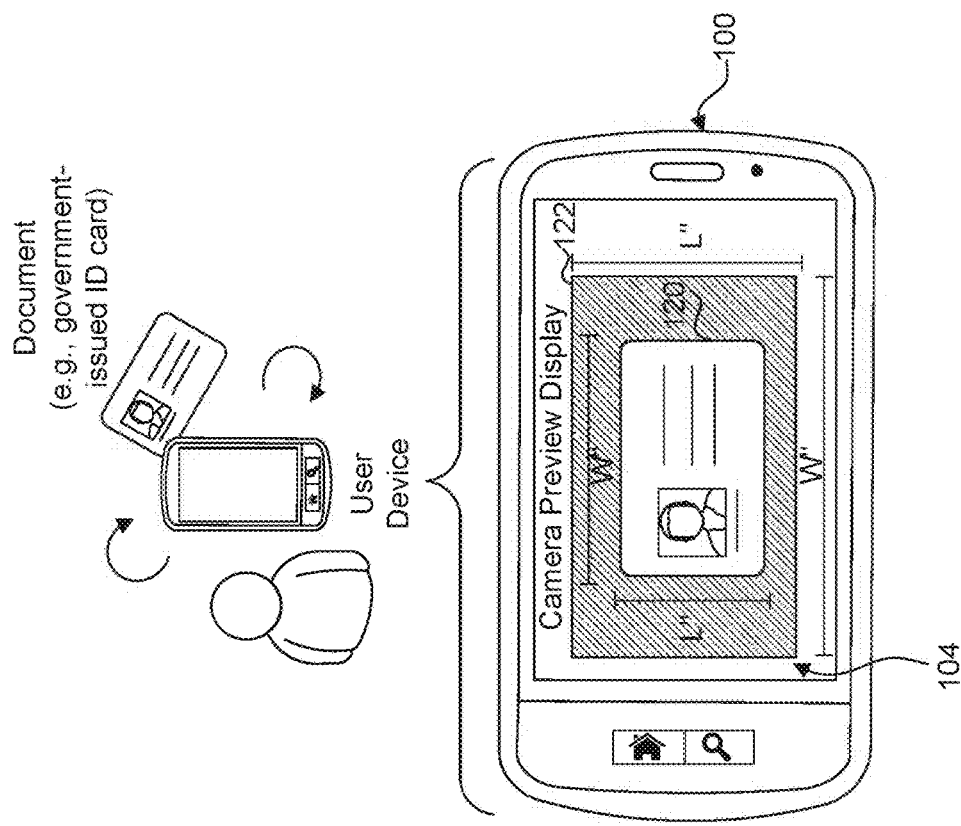
FIG. 1B is a diagram of an example device positioned for capturing an image according to an embodiment.

As a non-limiting example, entities such as financial institutions may need to virtually verify an identity of a user, while the user is interfacing with an application associated with the financial institution. The application may be executing on a device operated by the user. The financial institution may request an image and/or copy of an authentic government-issued identification (ID) card (e.g., driving license, passport, military ID, social security card, etc.). In the past, a device may have had difficulty determining whether an object in the image corresponded with an authentic specified document type. For example, conventional algorithms may not differentiate between two rectangular objects of different sizes yet having the same aspect ratio. In this regard, in response to a request for an image of an authentic government-issued ID card, conventional algorithms may allow a device to erroneously capture a rectangular object that may not be an authentic government-issued ID card, because the rectangular object is the same shape as a standard government-issued ID. The device may transmit the image of the rectangular object to an external server to determine its authenticity. In the event the image of the object is considered invalid, the external server would have to instruct the device to capture another image of a valid object corresponding to the government-issued ID card. In such a scenario, a large volume of users may be attempting to interface with the application to virtually verify their identity, such that the back and forth between the device and the external server to process images may cause a network bottleneck. Consequently, this would waste computational resources and network resources, and decrease operational efficiency. Further, repeated authentication failures may frustrate a user attempting to use the application.

Described herein are a method, system, and computer readable medium for automatically capturing images. In an embodiment, a device may execute an application on the device. The application may receive a request for capturing an image of a document. In response to receiving a request for capturing an image of a document, the application may control the operation of the camera to contemporaneously and continuously capture image frames of an area within the field of view of a camera of the device. The field of view may include an object and in turn may be included in the captured image frames. Each image frame may be associated with an environmental feature. The application may execute an image analysis and processing pipeline on each of the captured image frames, locally on the device. The application may determine whether the aspect ratio and real-world size of the object in the captured image frames corresponds with a specified threshold size and aspect ratio which corresponds with a given document type, based on the executed image analysis and processing pipeline on each of the captured image frames. In response to determining that the object corresponds to the given document type, the application may automatically extract an image of the object. The extracted image may be displayed on a display of the device.

The image analysis and processing pipeline may include identifying and/or tracking the object. Various image parameters such as size, aspect ratio, contrast, glare, distance, and focus may be calculated of the identified and/or tracked object. The image analysis and processing pipeline may process the image frames in real-time to ensure that only an image of an object having the size and aspect ratio corresponding to the requested document is captured. This shortens and simplifies the image capturing process, which conserves computing resources, power resources, and memory resources of the device that would otherwise need to be used in instances where images of an incorrect or invalid document are repeatedly captured. Additionally, this conserves computing resources, power resources, memory resources, and network resources associated with any backend platform that would be otherwise needed to receive and process images that may ultimately be determined to be of incorrect or invalid objects.

A system for automatically capturing images described herein provides for automatically determining whether an object in an image corresponds to a specified document type such as a government-issued ID card, based on determining a real-world size and an aspect ratio of the object in an image frame, and automatically extracting an image of the object, in real-time. The embodiments for automatically capturing images described herein may capture and process multiple images in real-time. Embodiments for automatically capturing images may be executed locally on the device so that a number of images (and thus the amount of data) transmitted between the device and a back-end server for processing is greatly reduced. This configuration reduces the need for computational resources and network resources, and increases operational efficiency.

FIG. 1A illustrates an example device 100 according to an embodiment. The device 100 may include a front side 102. The front side 102 may include a display 104 and a front camera 106. The device 100 may also include a back side 108 including a back camera 110. The front and back cameras 106, 110 may capture still or moving images. Once the front or back camera 106, 110 is made to be operational, the front or back camera 106, 110 may contemporaneously and continuously capture image frames of the area within the field of view of the front or back camera 106, 110. The area within the field of view of the front or back camera 106, 110 may be rendered on the display 104. An image may be captured by the front or back camera 106, 110, in response to user input or an automatic capture (auto capture) feature. The captured image may be rendered on the display 104.

In an embodiment, device 100 may execute an application residing on device 100. The application may be associated with an entity such as a financial institution. Based on a user's interaction with the application, the entity may request an image of a document. Based on the user's interaction with the device 100, the application may receive a request to capture and transmit an image of an object corresponding to the document. In response to receiving the request, the application may control the operation of front or back camera 106, 110 to contemporaneously and continuously capture image frames of the area within the field of view of the front or back camera 106, 110, including the object. The application will be described in further detail with respect to FIG. 2.

FIG. 1B is a diagram of the device 100 positioned for capturing an image of a first object 120. In an embodiment, the camera (e.g., back camera 110 as shown in FIG. 1A) of the device 100 may be positioned such that a first object 120 and a second object 122 are within the field of view of the camera. The first object 120 may have the same aspect ratio as the second object 122 however may be of a different size. For example, both the first and second object 120, 122 may be rectangular in shape, however, the first object 120 may be smaller than the second object 122. For example, the first object may be a government-issued ID, while the second object may be a notebook on which the government-issued ID is resting.

The device 100 may include a user interface configured to render each live image frame of the first and second objects 120, 122, as captured by the camera, on the display 104. As an example, the camera may be configured to capture image frames in one or more formats (e.g., NV21, YUV 4:2:0, red-green-blue (RGB) bitmap, etc. . . . ). The camera may provide image frames at a particular rate or quantity of image frames per second (e.g., 30 frames per second, 40 frames per second, 50 frames per second, etc.).

The device 100 may process each image frame in real-time to identify an outline (e.g., a rectangle) of an object in the image frame that corresponds with a given document type. For example and without limitation, the device 100 may convert each image frame into a grayscale image by normalizing the preview frame to a grayscale byte array. In an embodiment, the device 100 may convert the image frame to a byte array by discarding color channel data in the image frame, and retaining luminance channel data. The device 100 may then blur the grayscale image to reduce noise and facilitate edge detection. The device 100 may then apply a filter to highlight edges in the blurred grayscale image, dilate highlighted pixels, and identify contours of the highlighted pixels. In this example, the device 100 may further detect shapes from the contours, define bounding rectangles of the shapes and perform a filtering process on the bounding rectangles to identify a bounding rectangle that has an aspect ratio and/or size that corresponds to an aspect ratio and/or size of a particular document or particular type of document (e.g., government-issued ID such card such as driver's license). Based on identifying the bounding rectangle, the user device may determine an outline of the object (i.e., first object 120), in the image frame, that corresponds to a given document type. The user device may use both the aspect ratio and the real-world size to confirm that the object actually corresponds to the given document type. The real-world size is used to prevent the device from erroneously identifying another object within the field of view having a similar aspect ratio as the given document type desired. For example, use of the real-world size may allow the device to distinguish a government-issued ID from a flat screen TV showing text and pictures, a notebook, and/or the like. In an embodiment, the device 100 may use an Augmented Reality (AR) platform (e.g., ARCORE developed by Google Inc. of Mountain View, CA) to determine the real-world size of any object in each of the image frames. The AR platform may determine a real-world size of the object based on the determined outline of the object.

As an example, the AR Platform may determine the real-world size based on motion tracking, environmental understanding, and/or light estimation. For example, the AR platform may determine the position of the first object 120 and/or second object 122 relative to the real-world, using motion tracking. The AR Platform may use concurrent odometry and mapping to determine the position of the device 100 relative to its surroundings. The AR Platform may detect visually distinct features in the image frame which may be referred to as feature points to calculate a change in position of either the device 100 or the first object 120 and/or second object 122. The AR Platform may use inertial measurements determined by an inertial measurement unit (IMU) of the device 100 and the captured visual information to determine position and orientation (pose) of the camera of the device.

Furthermore, the AR Platform may also constantly understand the environment in which the first object 120 and/or second object 122 are disposed. The AR platform may determine feature points and planes. The AR Platform may determine clusters or groups of feature points which lie on a common plane (e.g., horizontal, vertical, or angled surfaces). The AR platform may determine the boundaries of these planes. The AR platform may determine the size and location of the surfaces. The AR Platform may further estimate an environment's lighting conditions. For example, the AR platform may detect information about the lighting of its environment based on an average intensity and color correction of a given image frame.

The AR platform may calculate the real-world size of the first object 120 and/or second object 122 based on determining the position of the first object 120 and/or second object 122, understanding the environment in which first object 120 and/or second object 122 by determining the sizes and location of the surfaces in the environment, and determining the lighting conditions of the environment. It can be appreciated that the AR platform may determine the real-world size of the first object 120 and/or second object 122 with or without consideration of the aspect ratio. The real-word size of the first object 120 and/or second object 122 may be the dimensions (i.e., height and width) of the first object 120 and/or second object 122. Alternatively or in addition to, the real-word size may be but is not limited to: area, surface area, circumference, perimeter, volume, and/or the like.

The device 100 may receive the calculated real-world size of the object for each image frame. The AR platform will be described in greater detail with respect to FIG. 2. In one embodiment, rather than using the AR platform, the real-world size may be calculated using data captured by the camera, such as depth field information.

In an embodiment, the device 100 may also determine image parameters other than aspect ratio and real-world size using the image analysis and processing pipeline as described above. For example, the device 100 may determine glare, focus, distance of the object with respect to the camera, contrast, resolution, and/or other image parameters associated with the image frame including an object.

Figure 1C:
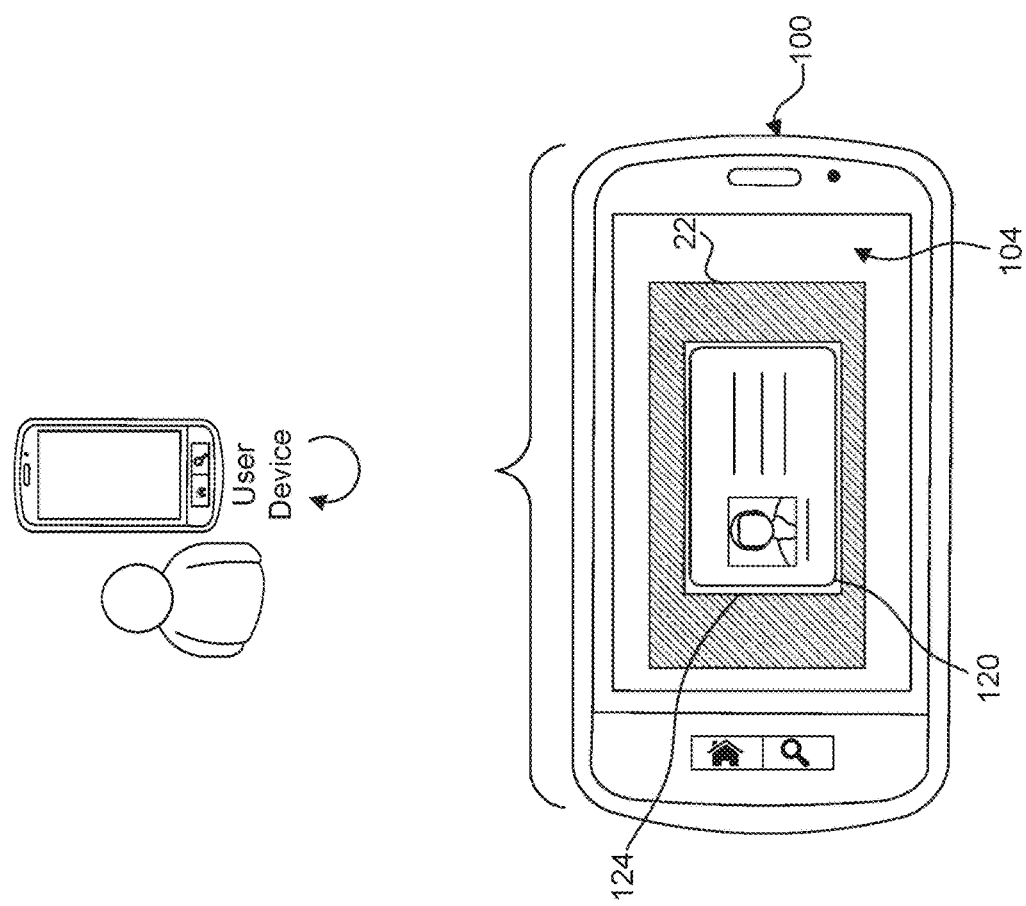
FIG. 1C is a diagram of a boundary box around a first object in an image frame according to an embodiment.

FIG. 1C is a diagram of an outline 124 around the first object 120 in the image frame. In an embodiment, the device 100 may identify a first object 120 and a second object 122 in the image frames. As described above, the display 104 may render each image frame. Additionally, the device 100 may process each image frame to determine an outline of an object within the image frame.

In response to the device 100 determining the outline of an object, the device 100 may overlay a boundary box 124 around the edges of the object. In an embodiment, overlaying the boundary box 124 around the edges of the object may also indicate that the device 100 has successfully identified the object to correspond to a given document type, based on the calculated real-world size and aspect ratio of the object. For example, an outline 124 may be a boundary box overlaid around the edges of the first object 120 as rendered on the display 104. The outline 124 may move as the first object moves within the field of view of the camera or as the device 100 itself moves. The size of the outline 124 may be determined based on the size of the first object 120.

In response to determining that the first object 120 corresponds with a given document type based on the determined real-world size and the aspect ratio of the first object 120, the device 100 may extract an image of the first object 120. The device 100 may extract the image of the first object 120, by cropping the first object 120 from within the outline 124.

As described above, the device 100 may determine the real-world size of any object in each image frame captured. In an embodiment, the calculation of the real-world size of an object may vary based on distance/angle of the camera with respect to the object. The device 100 may identify a real-world size of the object based on the difference in the calculations of one or more image frames being within a specified threshold. For example, in an initial set of image frames captured by the camera of the device 100, the calculations of the real-world size of the first object 120 may be drastically different from one another. However, in a subsequent set of image frames captured by the camera of the device 100, the difference between calculations of the real-world size of the first object 120 may be may be within a threshold amount. The device 100 may identify the real-world size of the first object based on the subsequent set of image frames based on the consistency of the calculations of the subsequent image frames.

As a non-limiting example, the first object 120 may embodied as a driver's license and the second object 122 may embodied as a book. The device 120 may determine that the real-world size of the first object 120 falls within threshold size of driving licenses of specific geographic areas (e.g., a specific country or worldwide). The device 120 may determine that the real-world size of the second object 122 does not fall within the threshold size of driving licenses of a specific geographic area. In response to determining that the real-world size of the first object 120 falls within threshold dimensions of driving licenses of specific geographic areas, the device 100 may determine that the first object 120 corresponds with a given document type (i.e., driving license). The device 100 may overlay a boundary box 124 around the edges of the first object 120. The device 100 may extract an image of the first object 120 by cropping the first object 120 from within the boundary box 124, such that the first object 120 is extracted from the remainder of the image frame.

Figure 1D:
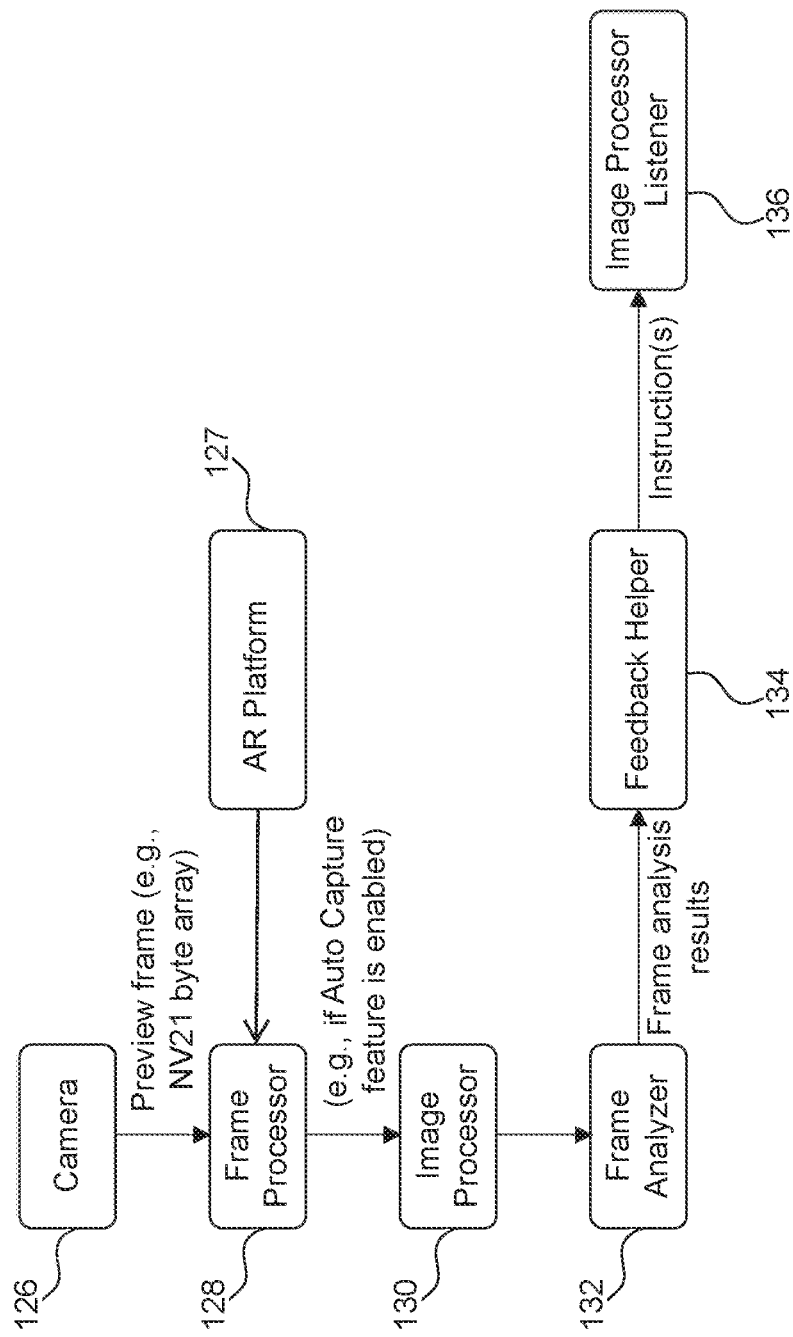
FIG. 1D is a block diagram of components an image analysis and processing pipeline according to an embodiment.

FIG. 1D is a block diagram of components in an image analysis and processing pipeline, according to an embodiment. As described above, a device (e.g., device 100 as shown in FIGS. 1A-1C) may include a camera 126. The camera 126 may embodied by the front and back camera of the device (e.g., front and back camera 106 and 110 as shown in FIG. 1A). As described above, the camera may capture in real-time, image frames of an object within the field of view of the camera. An AR platform 127 may calculate a real-world size of the object in each captured image frame. The AR platform 127 will be described in further detail with respect to FIG. 2. The corresponding image frame (e.g., as an NV21 byte array) may be provided to a frame processor 128, by the camera 126. Additionally, the calculated real-world size of the object may be provided to the frame processor 128 by the AR platform 127. The frame processor 128 may correlate the calculated real-world size of the object to the corresponding image frame. In an embodiment, the real-world size of the object may be calculated using data captured by the camera 126, such as depth of field information, without the use of the AR platform. The frame processor 128 may copy data of the preview frame and provide the copy to an image processor 130. In an embodiment, the frame processor 128 may provide the copy of the data only if the auto capture feature/function is enabled.

In response to the image processor 130 receiving the copy of the data from the frame processor 128, the image processor 130 may process the data to generate a grayscale image. The frame analyzer 132 may process and/or analyze the grayscale image by performing various processing operations. For example, the frame analyzer 132 may perform edge detection to detect an object of interest (e.g., an object in the image frame) in the grayscale image. Detecting an object of interest may include filtering all detected objects in the grayscale image based on image parameters such as aspect ratio or size, and tracking a position, a size, and/or rotation of the objects from one frame to the next. In an embodiment, the frame analyzer 132 may perform blurring, filtering, dilation, contour identification, shape detection, bounding rectangle creation, bounding rectangle filtering, calculating contrast values, calculating glare percentage values, calculating distance-related ratio values, calculating focus-related values, and other operations on the grayscale image.

The frame analyzer 132 may provide frame analysis results (e.g., outputs) to a feedback helper 134. The feedback helper 134 may determine whether to provide real-time feedback to the user of the device related to contrast, glare, distance, or other image parameters associated with the image frame. The feedback helper 134 may also determine whether to display a boundary box (e.g., boundary box 124 as shown in FIG. 1C) corresponding to the outline of an object of interest. The feedback helper 134 AR platform may determine whether the calculated real-world size of the object of interest, received by the frame processor 128, is within a specified threshold of the real-world size of a given document type, and/or whether the aspect ratio of the object of interest corresponds to a predetermined aspect ratio of a given document type. The feedback helper 134 may provide instructions to provide feedback to the user of the device or to display a boundary box around the outline of the object of interest, to the image processor listener 136. The image processor listener 136 may cause the user interface to render feedback to the user of the device and/or the boundary box overlaid around the edges of the object, based on the instructions from the frame analyzer 132.

In an embodiment, the feedback helper 134 may review the frame analysis results for multiple image frames and determine whether the values of image parameters (e.g., relating to glare, distance, focus, real-world size, aspect ratio, etc. . . . ) associated with multiple image frames satisfy thresholds. As an example, in deciding on whether to auto capture an image of an object of interest, the feedback helper 134 may calculate an average of the values of each of the image parameters (e.g., an average of the values associated with glare, an average of the values associated with focus, an average of the values associated with the real-world size, an average of the values associated with the aspect ratio, etc.) across multiple image frames (e.g., n most recent processed image frames). The feedback helper 134 may determine whether the average values of each of the image parameters fall within predetermined threshold values associated with the respective image parameters. In response to determining that all or some of the threshold values of the image parameters were satisfied, the feedback helper 134 may output instructions that trigger the camera to automatically capture an image of the object of interest. The feedback helper 134 may trigger the camera to extract an image of the object of interest from the image frame.

In an embodiment, focus may relate to how well edges are defined in the image frame or a quantity of edges detected in an image frame. In an embodiment, a continuous auto-focus feature (included on the device) may provide information regarding focus of the camera, which may be used by the image analysis and processing pipeline 123 to determine when to trigger auto capture. For example, a predetermined quantity of the most recent image frames captured by the device may be analyzed to determine whether a properly focused image may be captured by the device, and in turn whether auto capture may be used.

In an embodiment, the device may utilize frame analysis results from prior image frames to assist with determining the outline for an object in a current image frame. This reduces a quantity of calculations needed for processing image frames, which optimizes, and increases the overall speed of, the image analysis and processing pipeline 123.

Figure 1E:
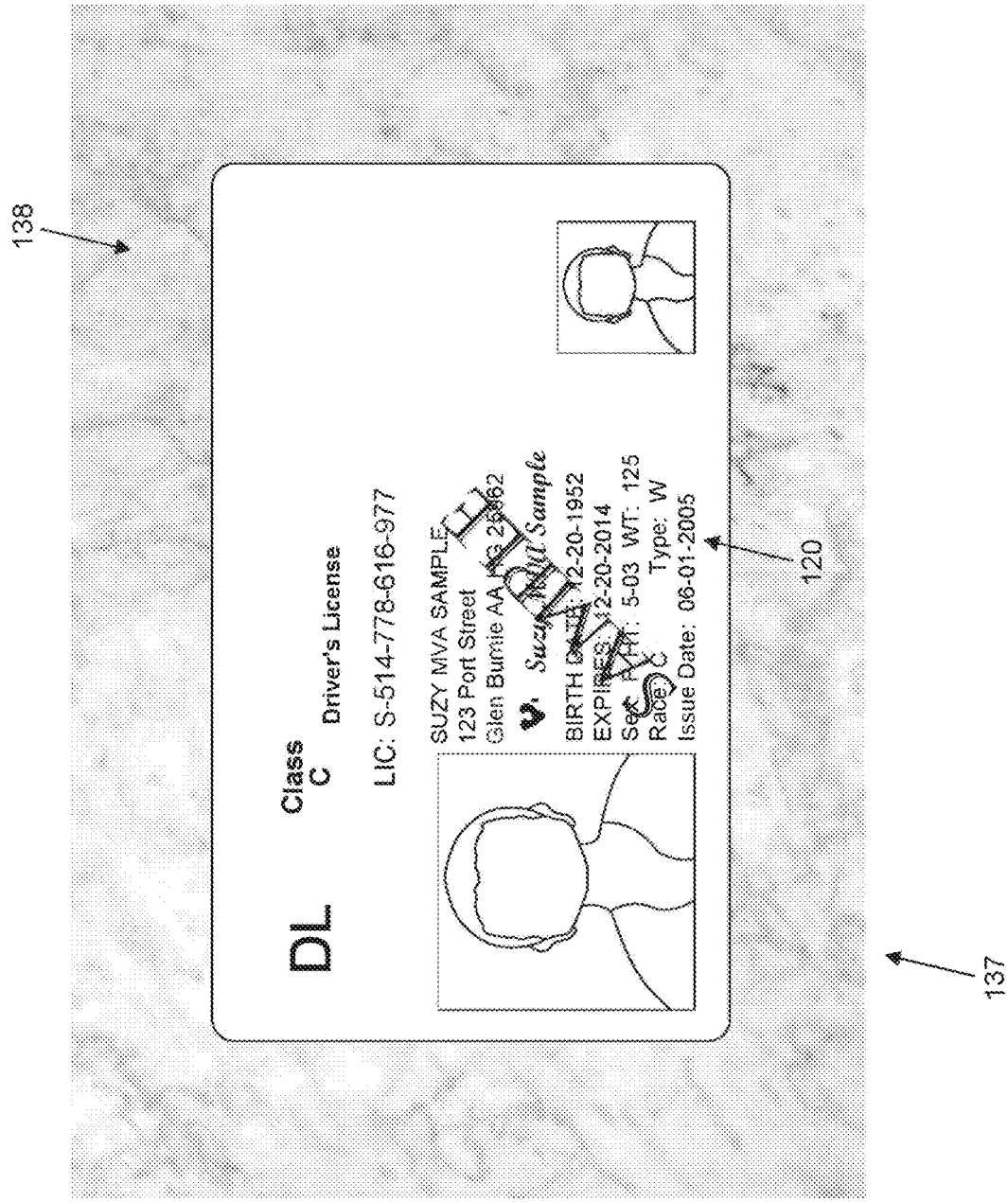
FIGS. 1E-1I are diagrams of image frames being processed during various stages of an example image analysis and processing pipeline, according to an embodiment.

FIGS. 1E-1I are diagrams of example image frames as being processed during various stages of the image analysis and processing pipeline as described above, according to an embodiment. With reference to FIG. 1E, an image frame 137 may include an image of the object 120 on a surface 138. The object 120 may be, for example, a government-issued ID card such as a driving license. The image frame 137 has been converted from a color image to a grayscale image.

Figure 1F:
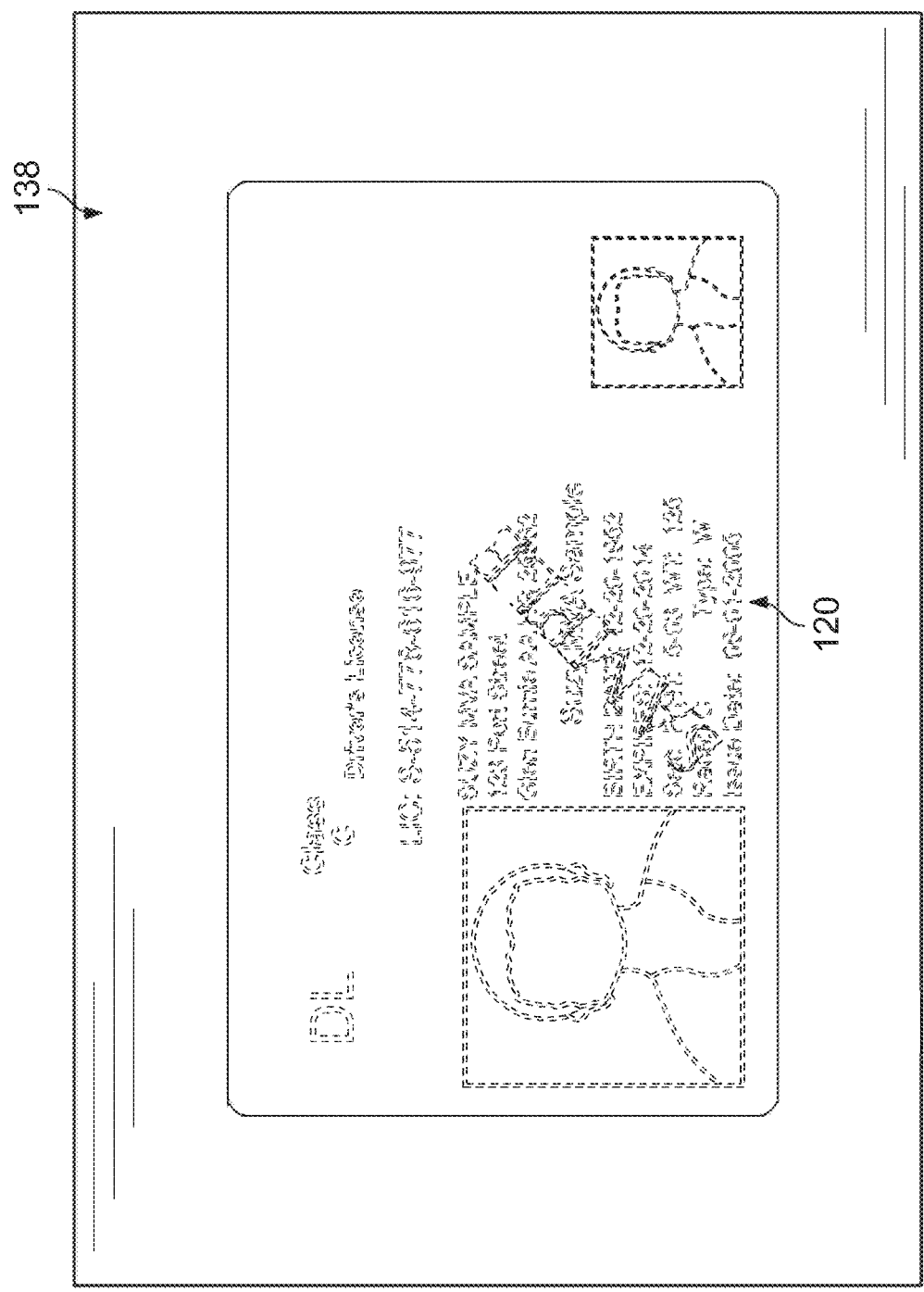
Figure 1G:
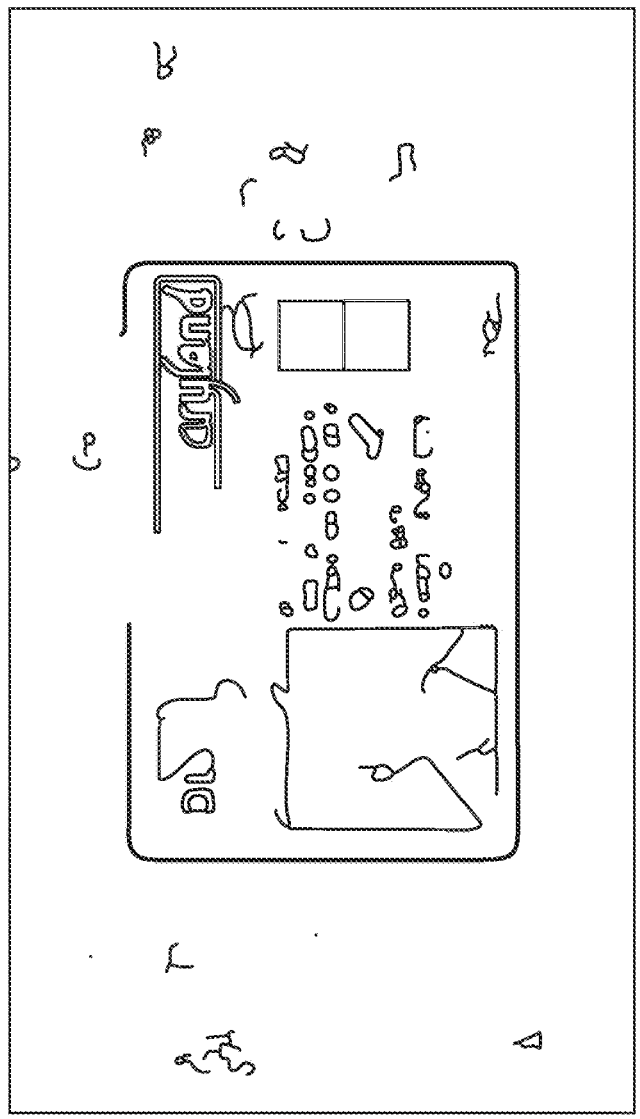
Figure 1H:
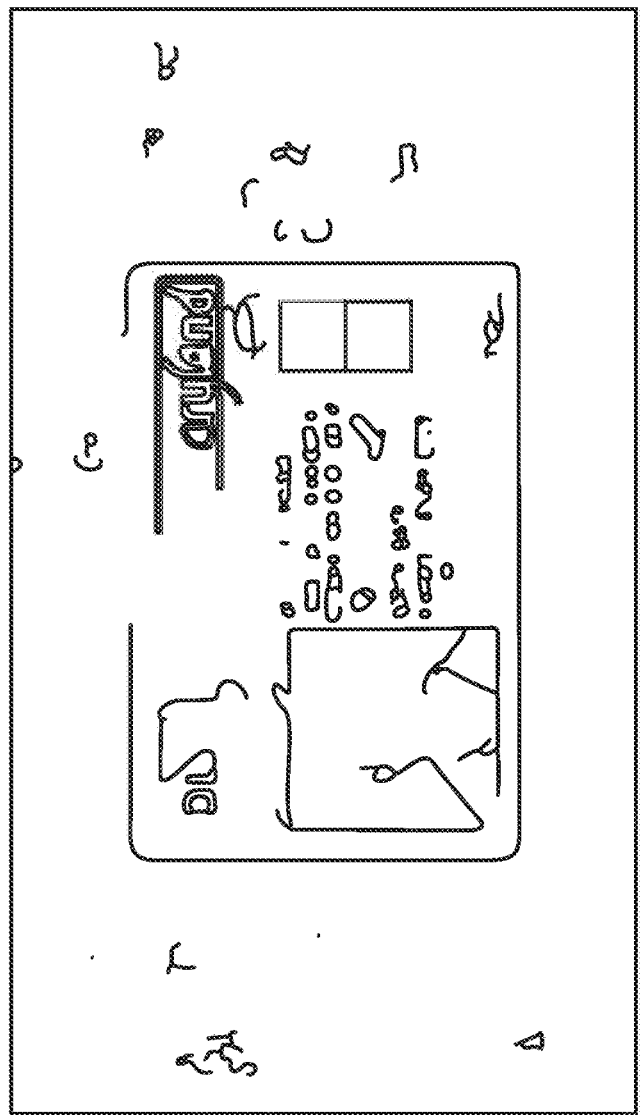
Figure 1I:
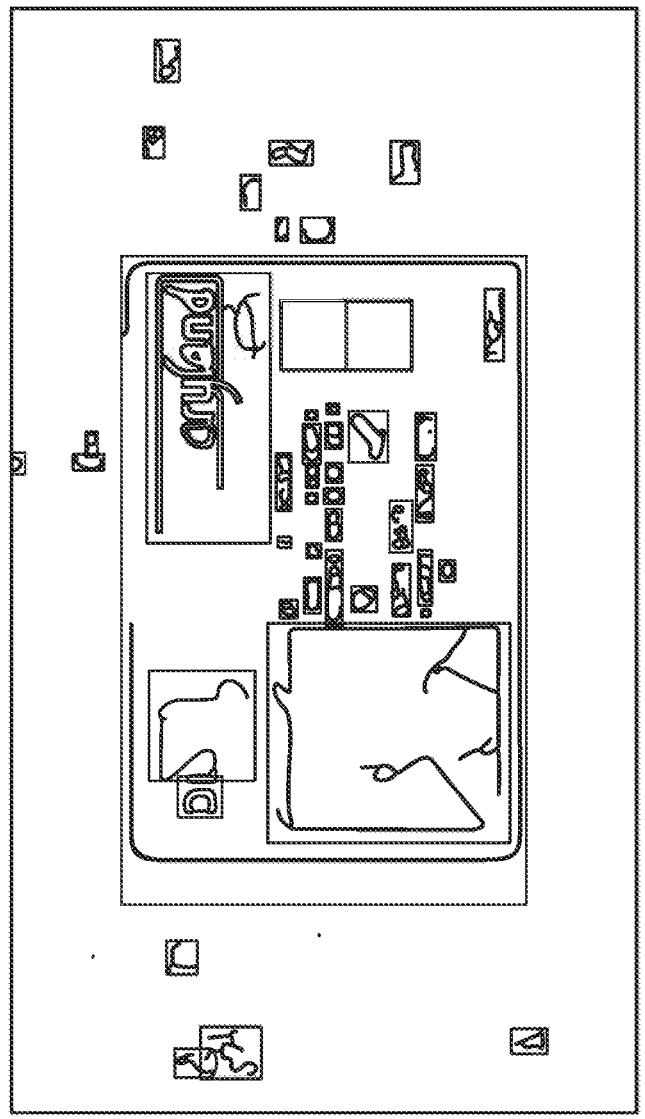

With reference to FIG. 1F, the image frame 137 may be blurred to facilitate edge detection. With reference to FIG. 1G, edges of the objects in the image frame 137 may be detected and identified in the blurred image. With reference to FIG. 1H, pixels in the image frame 137, in or proximate to the detected edges, may be dilated to fill in any gaps that might exist between lines. With reference to FIG. 1I, bounding rectangles may be crated for one or more identified objects in the image frame 137.

In an embodiment, a filtering process may be executed on the bounding rectangles (e.g., based on an aspect ratio and/or a specified threshold size of a government-issued ID card), to determine an outline of an object that corresponds with a specified document type (i.e., government-issued ID card).

The image analysis and processing pipeline may determine and identify, in real-time, an object from one or more objects in the image frame that correspond with a specified document type based on the aspect ratio and calculated real-world size of the objects in the image frame. In response to identifying the object that corresponds with the specified document type, an image of the identified object may be captured, such that any objects not corresponding to the specified document type are excluded from the image. In this configuration, the image analysis and processing pipeline accurately identifies the object that corresponds with a specified document type and in turn satisfies a request for an image of a document. This shortens, and simplifies, the image capturing process, which conserves computing resources, power resources, and memory resources of the device that would otherwise need to be expended in cases where images of erroneous objects are automatically captured. Additionally, this conserves computing resources, memory resources, and network resources associated with a backend platform that would be needed to process images of erroneous objects that are automatically captured.

FIG. 2 is a block diagram of an example environment 200 in which systems and/or methods described herein may be implemented. The environment 200 may include a device 100, a backend platform 215, a cloud computing environment 220, and a network 230. The devices of the environment 200 may be connected through wired connections, wireless connections, or a combination of wired and wireless connections.

In an example embodiment, one or more portions of the network 230 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The device 100 may include one or more devices configured to receive, generate, store, process, and/or provide information associated with images. The device 100 may include a communication and/or computing device, such as a desktop computer, mobile device, smartphone, tablet, subnotebook, laptop, personal digital assistant (PDA), gaming device, device integrated with a vehicle, a wearable communication device (i.e., a smart wristwatch, smart eyeglasses, etc. . . . ) and/or any other suitable computing device. As described above, the device 100 may include a display 104, a front camera 106, and a back camera 110. The device 100 may further include an application 204 including an AR platform 127, and an accelerometer 206. The application 204 may implement the image analysis and processing pipeline as described above, locally on the device, to identify and capture an image of an object in an image frame corresponding to a specified document type.

The backend platform 215 may include one or more devices configured to receive, generate, store, process, and/or provide information associated with images. The backend platform 215 may include a server or a group of servers. In an embodiment, the backend platform 215 may be hosted in a cloud computing environment 220. It may be appreciated that the backend platform 215 may not be cloud-based, or may be partially cloud-based. In an embodiment, the backend platform 215 may implement the image analysis and processing pipeline as described above to identify and capture an image of an object in an image frame corresponding to a specified document type.

The cloud computing environment 220 includes an environment that delivers computing as a service, whereby shared resources, services, etc. may be provided to the device 100 and/or the backend platform 215. The cloud computing environment 220 may provide computation, software, data access, storage, and/or other services that do not require end-user knowledge of a physical location and configuration of a system and/or a device that delivers the services. The cloud computing system 220 may include computer resources 222.

Each computing resource 222 includes one or more personal computers, workstations, computers, server devices, or other types of computation and/or communication devices. The computing resource(s) 222 may host the backend platform 215. The cloud resources may include compute instances executing in the computing resources 222. The computing resources 222 may communicate with other computing resources 222 via wired connections, wireless connections, or a combination of wired or wireless connections.

Computing resources 222 may include a group of cloud resources, such as one or more applications ("APPs") 222-1, one or more virtual machines ("VMs") 222-2, virtualized storage ("VS") 222-3, and one or more hypervisors ("HYPs") 222-4.

Application 222-1 may include one or more software applications that may be provided to or accessed by the device 100. In an embodiment, the application 204 may execute locally on the device 100. Alternatively, the application 222-1 may eliminate a need to install and execute software applications on the device 100. The application 222-1 may include software associated with backend platform 215 and/or any other software configured to be provided across the cloud computing environment 220. The application 222-1 may send/receive information from one or more other applications 222-1, via the virtual machine 222-2.

Virtual machine 222-2 may include a software implementation of a machine (e.g., a computer) that executes programs like a physical machine. Virtual machine 222-2 may be either a system virtual machine or a process virtual machine, depending upon the use and degree of correspondence to any real machine by virtual machine 222-2. A system virtual machine may provide a complete system platform that supports execution of a complete operating system (OS). A process virtual machine may execute a single program and may support a single process. The virtual machine 222-2 may execute on behalf of a user (e.g., device 100) and/or on behalf of one or more other backend platforms 215, and may manage infrastructure of cloud computing environment 220, such as data management, synchronization, or long duration data transfers.

Virtualized storage 222-3 may include one or more storage systems and/or one or more devices that use virtualization techniques within the storage systems or devices of computing resource 222. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 222-4 may provide hardware virtualization techniques that allow multiple operations systems (e.g., guest operating systems") to execute concurrently on a host computer, such as computing resource 222. Hypervisor 222-4 may present a virtual operating platform to the guest operating systems, and may manage the execution of the guest operating systems multiple instances of a variety of operating systems and may share virtualized hardware resources.

In an embodiment, the application 204 may be executed on the device 100. Based on user input, the application 204 may receive a request to capture an image of a document of a specified type. In response to receiving the request, the application 204 may control the operation of the front or back camera 106, 110 to continuously and contemporaneously capture image frames having a first object and second object within a field of view of the front or back camera 106, 110. Each image frame may be associated with at least one environmental feature. The environmental feature may include an angle with respect to the first and/or second object and the front or back camera 106, 110, a distance between the first and/or second object and the front or back camera 106, 110, elements other than the first and second object in the image frame, and/or the like. The display 104 may render each image frame, in real-time.

The application 204 may process each image frame to determine whether the first (or second, if multiple objects exist in the frame) object in the image frame corresponds with a document of the specified type. As described above, the application 204 may execute the image analysis and processing pipeline to process each image frame. For example, the image analysis and processing pipeline may convert the image frame into a grayscale image, generate a blurred image based on the grayscale image, detect edges in the blurred image, identify shapes based on the plurality of edges, define bounding rectangles for the shapes, and determine an outline of the first object and/or second object based on the bounding rectangles. In an embodiment, the application 204 may use OpenCV, developed by Intel, Inc. of Santa Clara, California and Willow Garage, Inc. of Menlo Park, California, as the edge detection algorithm, for real-time edge detection.

The application 204 may execute an augmented reality (AR) platform 127 to calculate a size of the first and/or second object in each image frame, based on the determined outline of the first and/or second object. The AR platform 127 may be embodied by, for example, ARCORE. The AR platform 127 may be configured, for example and without limitation, for motion tracking, environmental understanding, and/or light estimation.

Although various features and process flows of the AR platform 127 will be explained below with respect to ARCORE, a person of skill in the art will understand that other virtual reality or AR platforms may instead or additionally be used in similar ways.

With respect to motion tracking, and using the example of ARCORE, the AR platform 127 may use odometry and mapping to determine the device's 100 location with respect to objects around the device 100. For example, ARCORE identifies feature points in the image frame and uses the feature points to compute a change in location. Feature points may be visually distinct features (i.e., objects, surfaces, colors, etc. . . . ). These feature points may be embodied as environmental elements. Visual information in the image frame may be combined with inertial measurements from the device's 100 inertial measurement unit (IMU) (e.g., accelerometer 206) ARCORE, for example, may determine the position and orientation of the front or back camera 106, 110 relative to the objects around the device 100 over time. In an embodiment, ARCORE may define the outline of the first object and/or second object as anchors. Anchors may be used by ARCORE to track the position of the first object and/or second object over time.

With respect to environmental understanding, ARCORE may look for clusters of feature points that appear to lie on common horizontal and vertical surfaces. ARCORE identifies these surfaces as planes. ARCORE may determine each plane's boundary. As an example, the application 204 may determine whether the first or second object is disposed on a flat surface based on the identification of the planes in the image frames by ARCORE.

With respect to light estimation, ARCORE may detect information about the lighting in the environment in the image frame and output the average intensity and color correction of the image frames.

Thus, ARCORE may calculate a size (i.e., real-world size) of the first and/or second object in each image frame based on the outline of the first object and/or second object and based on determining the position of the first and second objects in the image frames, environmental understanding, and light estimation. As described above, the outline can be used to define anchors by ARCORE to effectively track the first object or second object over different image frames. ARCORE can measure the real-world size of the first object or the second object within the outline (e.g., defined by the anchors) using motion tracking, environmental understanding, and/or light estimation as described above.

The application 204 may receive from the AR platform 127 the calculated size of the first and/or second object, which is calculated by the AR platform 127 based on the outline of the first object and the environmental feature. As described above, the environmental features may be the surfaces on which the first or second objects are disposed, the position and orientation of the first and/or second object with respect to the front or back camera 106, 110, the distance of the first and/or second object with respect to the front or back camera 106, 110, and/or the like. The application 204 may also determine an aspect ratio of the first and second object based on the determined outline of the first and second object.

In an embodiment, rather than using an AR platform such as AR platform 127, the application 204 may determine the calculated size of the first and/or second object based on data captured by the front or back camera 106, 110. For example, front or back camera 106, 110 may capture depth of field information while capturing each image frame. The application 204 may determine the calculated size of the first and/or second object based on the depth of field information.

The application 204 may determine that the first object corresponds to a predetermined document type based on the calculated size of the first object in one or more image frames of the plurality of image frames being within a threshold size, and the aspect ratio of the first object corresponding to a predetermined aspect ratio. The predetermined aspect ratio and threshold size may correspond with the predetermined document type. The application may automatically extract an image of the first object from the one or more image frames, in response to determining that the size of the first object is within the threshold size, and the aspect ratio of the first object corresponding to a predetermined aspect ratio.

As another example, the application 204 may determine that the aspect ratio of the second object corresponds with the predetermined aspect ratio, yet fails to correspond to the given document type based on a calculated size of the second object failing to fall within the threshold size. The extracted image of the first object thus would exclude the second object.

In an embodiment, the application 204 may compare the calculated size of the first and/or second object, received from the AR platform 127 for a given image frame, to the calculated size of the first and/or second object received for other image frames to determine a consistency in calculated sizes of the first and/or second object across the one or more image frames. The application 204 may identify a final calculated size of the first and/or second object based on calculated sizes of the first object across the one or more image frames when the determined consistency meets a given threshold. For example, in the event that the calculated sizes of the first object across a first set of image frames vary more than a specified threshold, the application may not rely on the calculated sizes from the first set of image frames to determine the final calculated size of the first object. Alternatively, or in addition, in the event that the difference in the calculated sizes of the first object across a second set of image frames are within a specified threshold, the application may use the calculated sizes of the first object in the second set of image frames to determine the final calculated size of the first object. As an example, the application 204 may calculate an average of the calculated sizes in the second set of image frames to determine the final calculated size of the first object.

In an embodiment, the application 204 may monitor movement of an accelerometer 206 of the device 100 while the front or back camera 106, 110 captures the image frames. The application 204 may determine the consistency of the calculated sizes based on the movement of the accelerometer. In an embodiment, the application 204 may determine an accuracy of the calculated size of the first and/or second object determined for each image frame based on tilt motion and orientation data of the device for each captured image frame of the plurality of image frames. In an embodiment, the device 100 stores data associated with the most recent image frames captured and processed in a temporary buffer. For example, the device 100 may store the data associated with the last 5 image frames. The data may include calculated sizes of objects, feature points in the image frames, coordinate mappings of the image frames, etc.

In an embodiment, the application 204 may receive a request for an image of the front and back of the document. In an embodiment, in response to determining that an object corresponds to a given document type, the application 204 may render a boundary box overlaid around the edges of the object.

In an embodiment, the image analysis and processing pipeline may also determine values for contrast, glare, distance, and/or focus, of each image frame. The application 204 may determine whether the values for contrast, glare, distance, and/or focus for each image frame meet corresponding threshold values. In the event that one or more values for contrast, glare, distance, and/or focus do not meet the corresponding threshold values, the application 204 may restrict the front or back camera 106, 110 from extracting the image of the first object, to ensure that only a high resolution image of the object is captured.

As a non-limiting example, the application 204 may be associated with a financial institution. The financial institution may require a user to provide identification to perform certain functions using the application 204. Financial institutions may need to distinguish between images of user's identification document which include authentic identification documents rather than fake identification documents, invalid identification documents, an image of an identification document, or irrelevant objects in the image. In an embodiment, the application 204 may automatically capture and transmit an image of the user's identification document. The document may be at least one of but is not limited to a government-issued identification card, a health insurance card, an employee identification card, or an identification card issued by a non-government institution. The application 204 may recognize that an object in the image corresponds with a user's identification documentation based on the determined real-world size of the object in the image and the determined aspect ratio of the object in the image. The aspect ratio may correspond to a shape of the object. The application 204 may attempt to verify that both the aspect ratio and real-world size of an object corresponds to a user's identification document so that objects in the image that are of different shapes but the same real-world size as a user identification card are not recognized as user identification documents. The application 204 may compare the determined real-world size and aspect ratio of the object in the image to known standardized sizes of specific identification documents, such as driver's licenses, passports, social security cards, and/or the like. Once the application is able to identify the object in the image is a user's identification document, the application 204 may extract the image of the object and transmit the image to a server for further processing.

In an embodiment, the application 204 may receive the real-world size of an object in the image in a format compatible with an expected shape of a user identification document. For example, the application 204 may receive the real-world size of an object in an image in a format of length and width of a rectangular shape. In view of this, the application 204 may not need to determine the aspect ratio of the object in the image as the application 204 can infer the shape of the object in the image from the received real-world size. Therefore, the application 204 may recognize that the object in the image corresponds to a user's identification document solely based on the determined real-world size of the object in the image.

Figure 3:
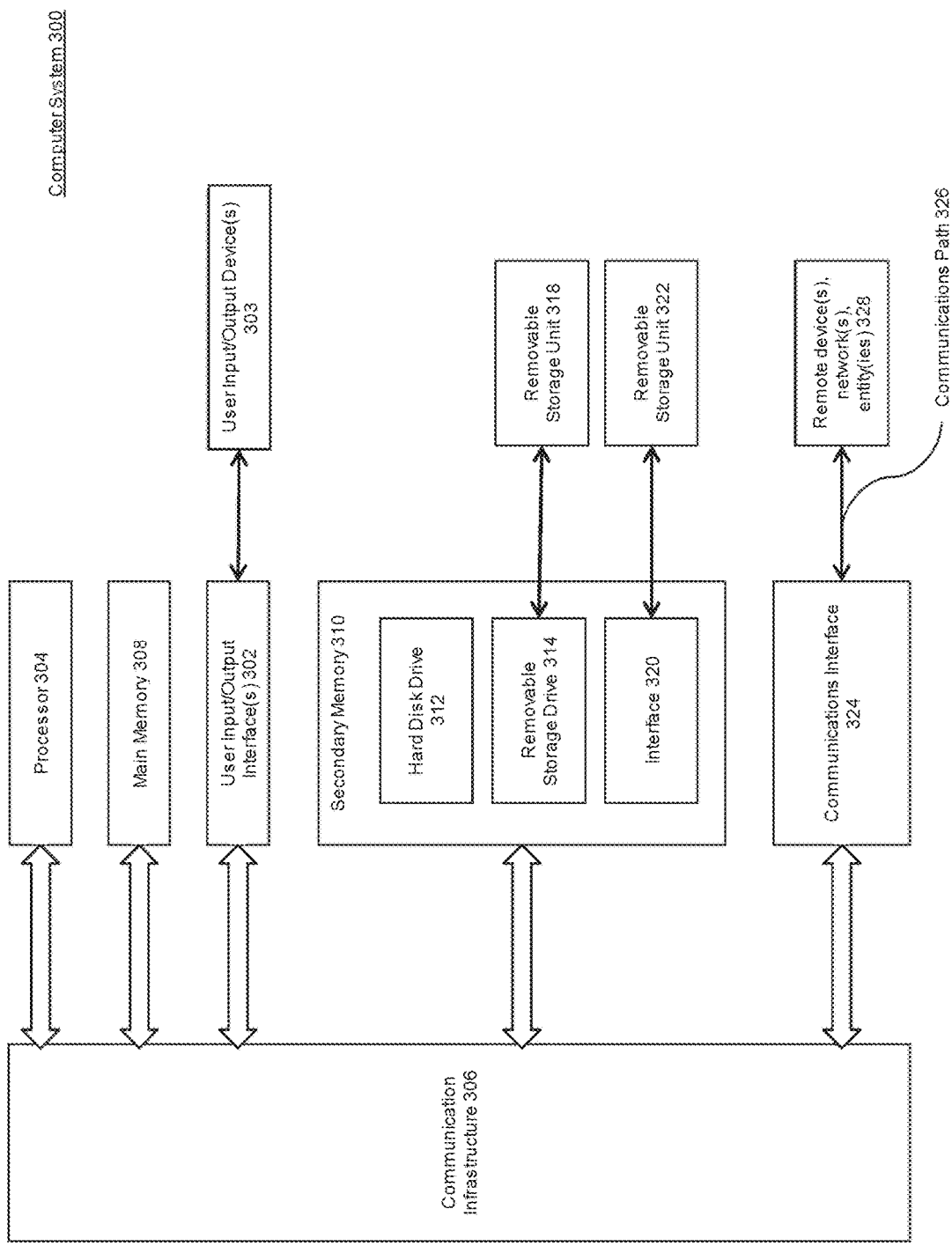
FIG. 3 is a block diagram of example components of a computing system according to an embodiment.

FIG. 3 is a block diagram of example components of device 300. One or more computer systems 300 may be used, for example, to implement any of the embodiments discussed herein, as well as combinations and sub-combinations thereof. Computer system 300 may include one or more processors (also called central processing units, or CPUs), such as a processor 304. Processor 304 may be connected to a communication infrastructure or bus 306.

Computer system 300 may also include user input/output device(s) 303, such as monitors, keyboards, pointing devices, etc., which may communicate with communication infrastructure 306 through user input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314.

Removable storage drive 314 may interact with a removable storage unit 318. Removable storage unit 318 may include a computer usable or readable storage device having stored thereon computer software (control logic) and/or data. Removable storage unit 318 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Figure 4:
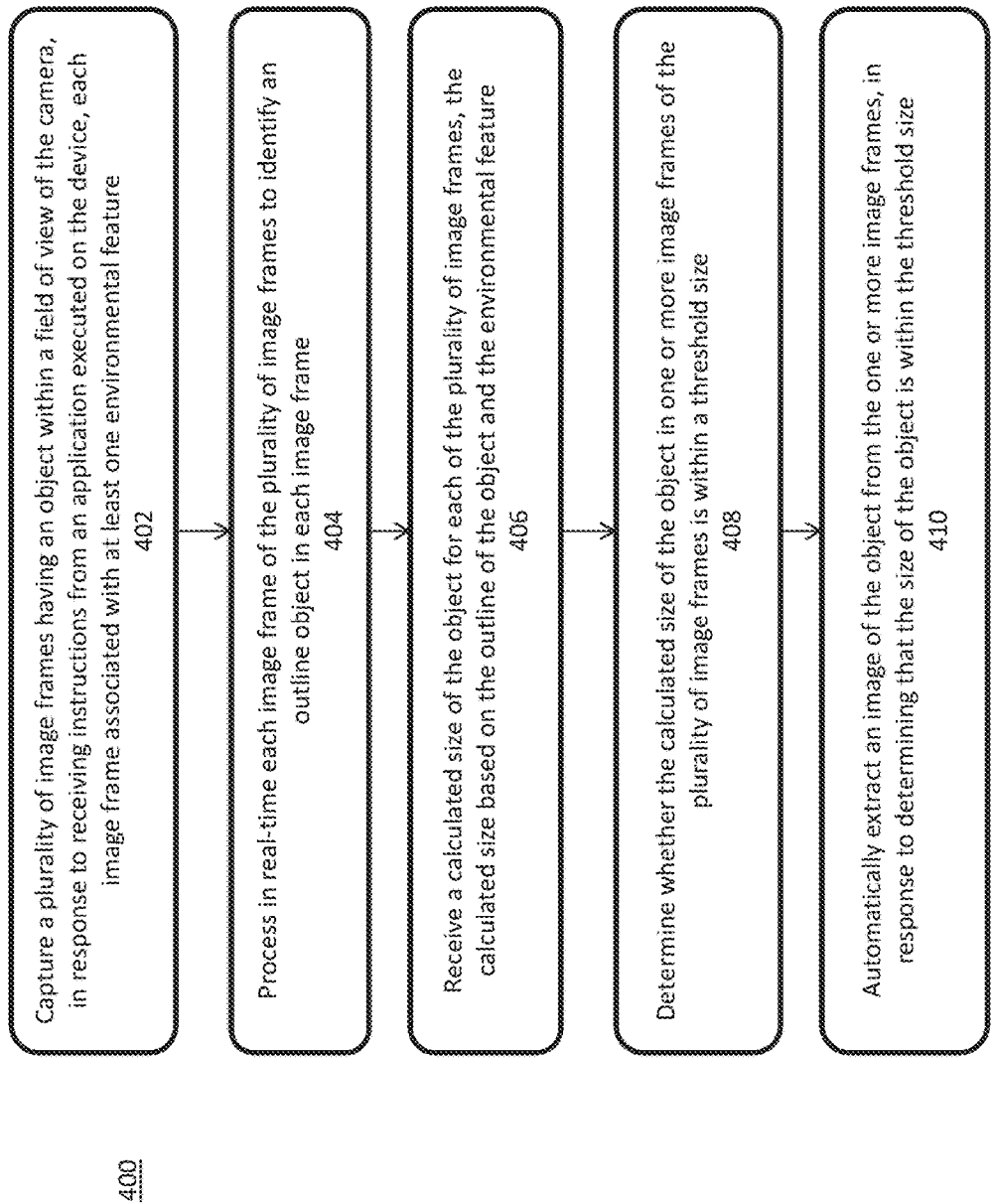
FIG. 4 is a flowchart illustrating a process implemented by a system for automatically capturing images according to an embodiment.

FIG. 4 is a flowchart illustrating a process 400 implemented by a system for automatically capturing images according to an exemplary embodiment. In operation 402, in response to receiving instructions from an application (e.g., application 204 as shown in FIG. 2) executed on a device (e.g., device 100 as shown in FIGS. 1A-1C and 2), a camera (e.g., front and back camera 106, 110 as shown in FIGS. 1 and 2 and camera 126 as shown in FIG. 1D) of the device may capture image frames having an object (e.g., first object and/or second object 120, 122 as shown in FIGS. 1B-1C) within a field of view of the camera. Each image frame may be associated with at least one environmental feature. In operation 404, the application executed on the device may process in real-time each image frame to identify an outline of the object in each image frame. In operation 406 the application may receive a calculated size of the object for each of the plurality of image frames, the calculated size based on the outline of the object and the environmental feature. In operation 408, the application may determine whether the calculated size of the object in one or more image frames is within a threshold size. In operation 410, the application may extract an image of the object from the one or more image frames, in response to determining that the size of the object is within the threshold size.

Figure 5:
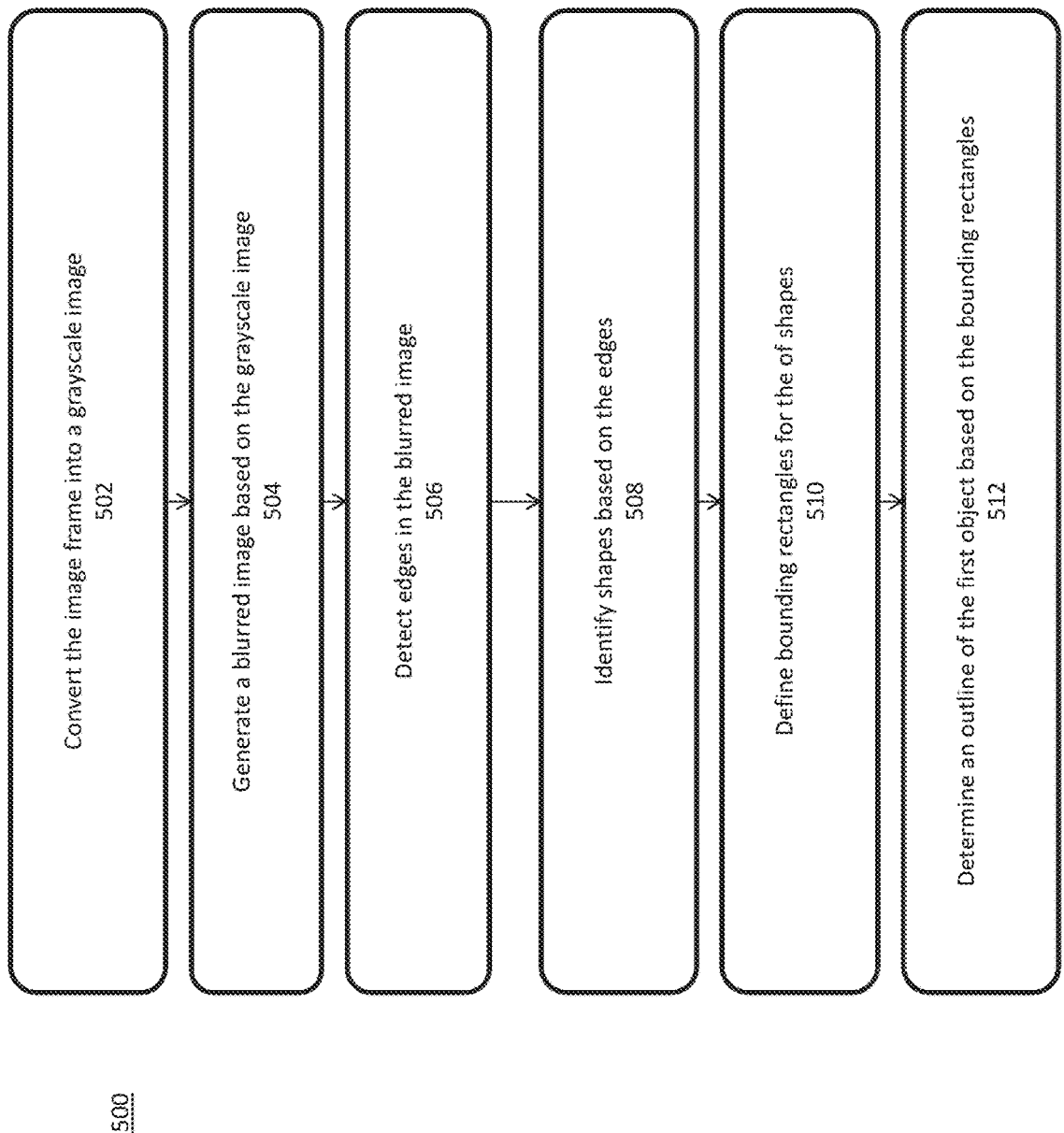
FIG. 5 is a flowchart illustrating a process implemented by a system for automatically capturing images according to an embodiment.

FIG. 5 is a flowchart illustrating a process 500 implemented by a system for automatically capturing images according to an exemplary embodiment. The process 500 illustrates the steps of processing an image frame to identify an outline of an object in the image frame. In operation 502, an application (e.g., application 204 as shown in FIG. 2) executing on a device (e.g., device 100 as shown in FIGS. 1A-1C and 2) converts an image frame into a grayscale image. In operation 504, the application generates a blurred image based on the grayscale image. In operation 506, the application identifies edges in the blurred image. In operation 508, the application identifies shapes based on the identified edges. In operation 510, the application defines rectangles for the identified shapes. In operation 512, the application determines an outline based on the bounded rectangles.

Figure 6:
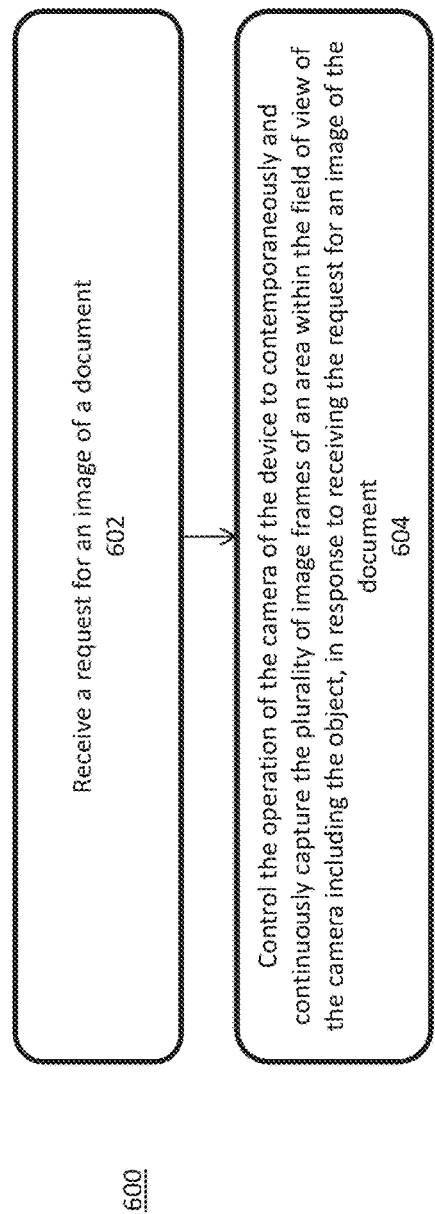
FIG. 6 is a flowchart illustrating a process implemented by a system for automatically capturing images according to an embodiment.

FIG. 6 is a flowchart illustrating a process 600 implemented by a system for automatically capturing images according to an exemplary embodiment. In operation 602, an application (e.g., application 204 as shown in FIG. 2) executing on a device (e.g., device 100 as shown in FIGS. 1A-1C and 2) may receive a request for an image of a document. In operation 604, the application may control the operation of a camera (e.g., front and back camera 106, 110 as shown in FIGS. 1 and 2 and camera 126 as shown in FIG. 1D) of the device to contemporaneously and continuously capture image frames of an area within the field of view of the camera including an object (e.g., first object and/or second object 120, 122 as shown in FIGS. 1B-1C), in response to receiving the request for an image of the document.

Figure 7:
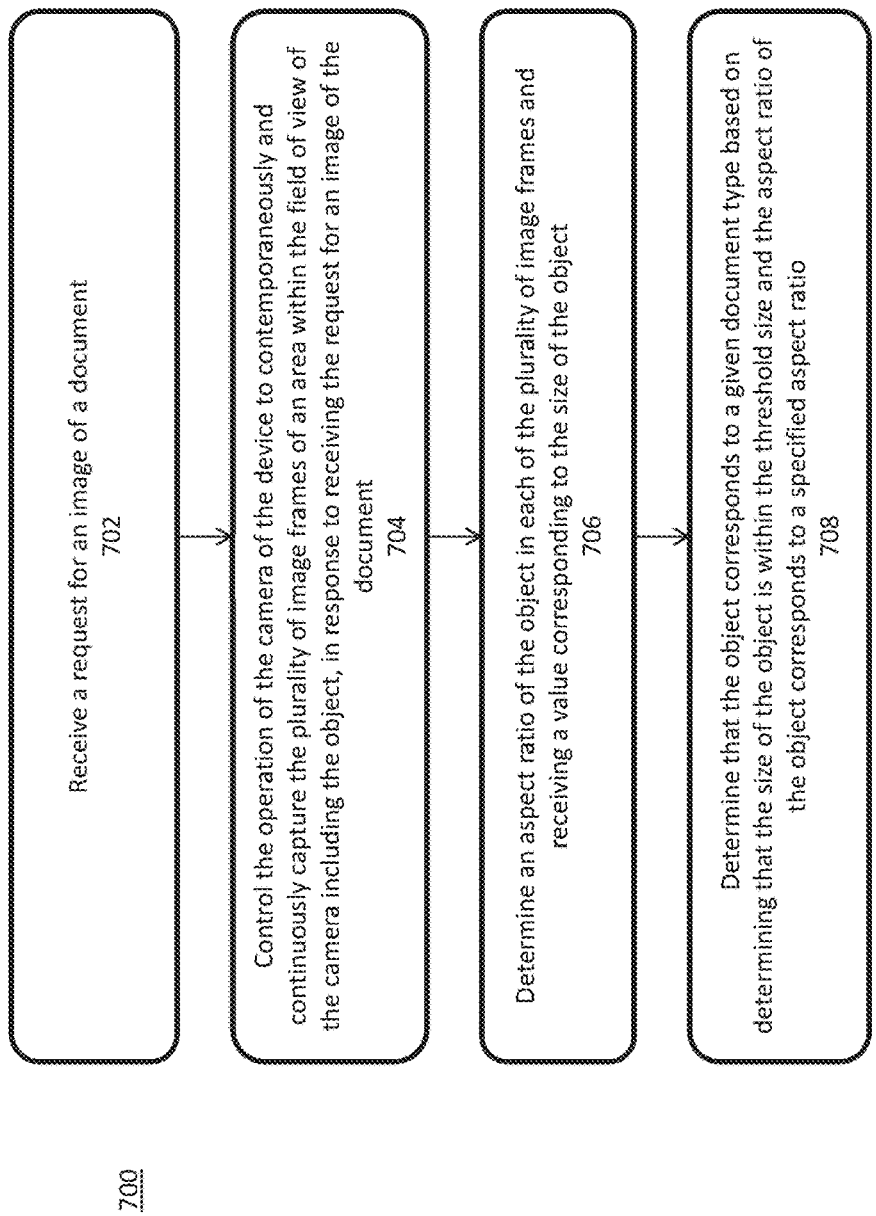
FIG. 7 is a flowchart illustrating a process implemented by a system for automatically capturing images according to an embodiment.

FIG. 7 is a flowchart illustrating a process 700 implemented by a system for automatically capturing images according to an exemplary embodiment. In operation 702, an application (e.g., application 204 as shown in FIG. 2) executing on a device (e.g., device 100 as shown in FIGS. 1A-1C and 2) may receive a request for an image of a document. In operation 704, the application may control the operation of a camera (e.g., front and back camera 106, 110 as shown in FIGS. 1 and 2 and camera 126 as shown in FIG. 1D) of the device to contemporaneously and continuously capture image frames of an area within the field of view of the camera including an object (e.g., first object and/or second object 120, 122 as shown in FIGS. 1B-1C), in response to receiving the request for an image of the document. In operation 706, the application determines an aspect ratio of the object in each of the image frames and receives a value corresponding to the size of the object. In operation 708, the application determines that the object corresponds to a given document type based on determining that the size of the object is within the threshold size and the aspect ratio of the object corresponds to a specified aspect ratio.

Figure 8:
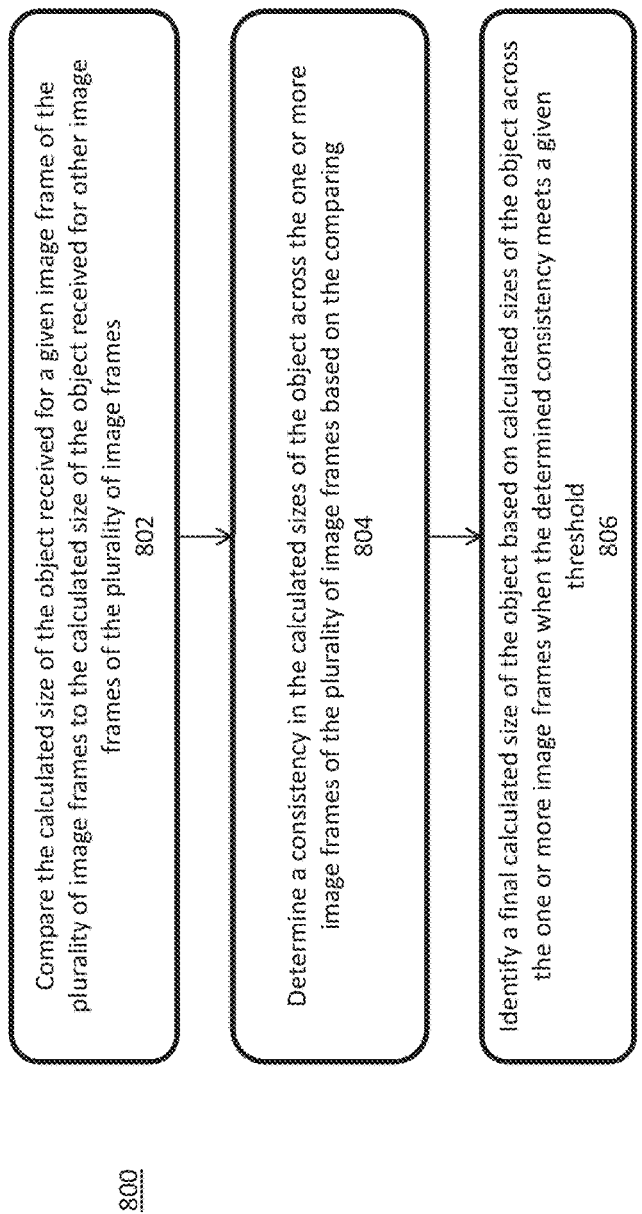
FIG. 8 is a flowchart illustrating a process implemented by a system for automatically capturing images according to an embodiment.

FIG. 8 is a flowchart illustrating a process 800 implemented by a system for automatically capturing images according to an exemplary embodiment. In operation 802, an application (e.g., application 204 as shown in FIG. 2) executing on a device (e.g., device 100 as shown in FIGS. 1A-1C and 2) may compare a calculated size of an object (e.g., first object and/or second object 120, 122 as shown in FIGS. 1B-1C) received for a given image frame to the calculated sizes of the object received for other image frames. In operation 804, the application may determine a consistency in the calculated sizes of the object across one or more image frames based on the comparison. In operation 806, the application may identify a final calculated size of the object based on calculated sizes of the object across the one or more image frames when the determined consistency meets a given threshold.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for automatically capturing images, comprising:
    obtaining, by at least one processor, an image frame having a first object within a field of view of a camera, the image frame associated with at least one environmental feature, wherein the at least one environmental feature includes at least one of: an angle with respect to the first object and the camera, a distance between the first object and the camera, or a second object other than the first object in the image frame;
    processing, in real-time, by the at least one processor, the image frame to identify an outline of the first object in the image frame; and
    determining, by the at least one processor, the first object corresponds with an object type based on at least one image parameter value being within a threshold value, wherein the at least one image parameter value is determined based on the outline of the first object and the at least one environmental feature.

2. The method of claim 1, wherein the at least one image parameter value comprises a calculated size of the first object, and wherein the calculated size of the first object in the image frame corresponds to a real-world size of the first object.

3. The method of claim 1, wherein the processing comprises:
    converting, by the at least one processor, the image frame into a grayscale image;
    generating, by the at least one processor, a blurred image based on the grayscale image;
    detecting, by the at least one processor, a plurality of edges in the blurred image;

identifying, by the at least one processor, a plurality of shapes based on the plurality of edges;

defining, by the at least one processor, a plurality of bounding rectangles for the plurality of shapes; and determining, by the at least one processor, the outline of the first object based on the plurality of bounding rectangles.

4. The method of claim 1, further comprising:

controlling, by the at least one processor, operation of the camera of a device to capture the image frame including an area within the field of view of the camera including the first object, in response to receiving a request for an image of a document.

5. The method of claim 1, wherein the at least one image parameter value comprises an aspect ratio of the first object in the image frame determined by the at least one processor.

6. The method of claim 1, further comprising: determining, by the at least one processor, whether a consistency of image parameter values across image frames including the image frame is within a given threshold.

7. The method of claim 6, further comprising: determining, by the at least one processor, a final image parameter value in response to determining that the consistency of the image parameter values across the image frames is within the given threshold.

8. A system for automatically capturing images, the system comprising:

a memory; and at least one processor coupled to the memory, wherein the at least one processor is configured to:

obtain an image frame having a first object within a field of view of a camera, the image frame associated with at least one environmental feature, wherein the at least one environmental feature includes at least one of: an angle with respect to the first object and the camera, a distance between the first object and the camera, or a second object other than the first object in the image frame;

process, in real-time, the image frame to identify an outline of the first object in the image frame; and determine the first object corresponds with an object type based on at least one image parameter value being within a threshold value, wherein the at least one image parameter value is determined based on the outline of the first object and the at least one environmental feature.

9. The system of claim 8, wherein the at least one image parameter value comprises a calculated size of the first object, and wherein the calculated size of the first object in the image frame corresponds to a real-world size of the first object.

10. The system of claim 8, wherein when processing the image frame the at least one processor is configured to:

convert the image frame into a grayscale image;

generate a blurred image based on the grayscale image;

detect a plurality of edges in the blurred image;

identify a plurality of shapes based on the plurality of edges;

define a plurality of bounding rectangles for the plurality of shapes; and determine the outline of the first object based on the plurality of bounding rectangles.

11. The system of claim 8, wherein the at least one processor is further configured to:

control operation of the camera of a device to capture the image frame including an area within the field of view of the camera including the first object, in response to receiving a request for an image of a document.

12. The system of claim 8, wherein the at least one image parameter value comprises an aspect ratio of the first object in the image frame determined by the at least one processor.

13. The system of claim 8, wherein the at least one processor is further configured to determine whether a consistency of image parameter values across image frames including the image frame is within a given threshold.

14. The system of claim 13, wherein the at least one processor is further configured to determine a final image parameter value in response to determining that the consistency of the image parameter values across the image frames is within the given threshold.

15. A non-transitory computer-readable medium having instructions stored thereon that, when executed by at least one computing device, cause the at least one computing device to perform operations, the operations comprising:

obtaining an image frame having a first object within a field of view of a camera, the image frame associated with at least one environmental feature, wherein the at least one environmental feature includes at least one of: an angle with respect to the first object and the camera, a distance between the first object and the camera, or a second object other than the first object in the image frame;

processing the image frame to identify an outline of the first object in the image frame; and determining the first object corresponds with an object type based on at least one image parameter value being within a threshold value, wherein the at least one image parameter value is determined based on the outline of the first object and the at least one environmental feature.

16. The non-transitory computer-readable medium of claim 15, wherein the at least one image parameter value comprises a calculated size of the first object, and wherein the calculated size of the first object in the image frame corresponds to a real-world size of the first object.

17. The non-transitory computer-readable medium of claim 15, wherein the processing comprises:

converting the image frame into a grayscale image;

generating a blurred image based on the grayscale image;

detecting a plurality of edges in the blurred image;

identifying a plurality of shapes based on the plurality of edges;

defining a plurality of bounding rectangles for the plurality of shapes; and determining the outline of the first object based on the plurality of bounding rectangles.

18. The non-transitory computer-readable medium of claim 15, wherein the operations further comprise:

controlling operation of the camera of a device to capture the image frame including an area within the field of view of the camera including the first object, in response to receiving a request for an image of a document.

19. The non-transitory computer-readable medium of claim 15, wherein the at least one image parameter value comprises an aspect ratio of the first object in the image frame.

20. The non-transitory computer-readable medium of claim 15, wherein the operations further comprise:

determining whether a consistency of image parameter values across image frames including the image frame is within a given threshold; and determining a final image parameter value in response to determining that the consistency of the image parameter values across the image frames is within the given threshold.

* * * * *